US012456810B2

(12) United States Patent
Li et al.

(10) Patent No.: US 12,456,810 B2
(45) Date of Patent: Oct. 28, 2025

(54) ANTENNA AND ELECTRONIC DEVICE

(71) Applicants: Beijing BOE Technology Development Co., Ltd., Beijing (CN); BOE TECHNOLOGY GROUP CO., LTD., Beijing (CN)

(72) Inventors: Chunxin Li, Beijing (CN); Jingwen Guo, Beijing (CN); Qianhong Wu, Beijing (CN); Feng Qu, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/920,093

(22) PCT Filed: Nov. 24, 2021

(86) PCT No.: PCT/CN2021/132765

§ 371 (c)(1),
(2) Date: Oct. 20, 2022

(87) PCT Pub. No.: WO2023/092328

PCT Pub. Date: Jun. 1, 2023

(65) Prior Publication Data

US 2024/0222870 A1 Jul. 4, 2024

(51) Int. Cl.
*H01Q 9/04* (2006.01)

(52) U.S. Cl.
CPC .................................. *H01Q 9/0442* (2013.01)

(58) Field of Classification Search
CPC .......... H01Q 21/065; H01Q 1/38; H01Q 3/24; H01Q 9/0407; H01Q 9/0442; H01Q 1/24;
(Continued)

(56) References Cited

U.S. PATENT DOCUMENTS 6,452,124 B1 * 9/2002 York .......................... H01G 5/18
361/233
6,844,852 B1 * 1/2005 Simons ................ H01Q 9/0407
343/700 MS (Continued)

FOREIGN PATENT DOCUMENTS

CN 102437420 A 5/2012
CN 106067601 A 11/2016

(Continued)

OTHER PUBLICATIONS

Simons et al. MEMS Acuators for Antenna Reconfigurability. (Year: 2001).*

*Primary Examiner* — Dimary S Lopez Cruz
*Assistant Examiner* — Anna N Hamadyk
(74) *Attorney, Agent, or Firm* — HOUTTEMAN LAW LLC

(57) ABSTRACT

An antenna including a dielectric layer, and a first radiation patch and at least one second radiation patch on the dielectric layer; wherein each second radiation patch is connected to the first radiation patch through at least one switch unit; a side edge of the first radiation patch has at least one first opening; each switch unit includes a signal electrode and a membrane bridge; the signal electrode includes a first end connected to the second radiation patch and a second end opposite to the first end; an orthographic projection of the second end on the dielectric layer is within an orthographic projection of one first opening on the dielectric layer; the membrane bridge spans the one first opening and is electrically connected to the first radiation patch; and a first insulating layer is on a surface of the signal electrode close to the membrane bridge.

19 Claims, 20 Drawing Sheets

(58) Field of Classification Search
CPC .. H01Q 1/36; H01Q 1/50; H01Q 9/04; H01Q 21/00
See application file for complete search history.

(56) References Cited

U.S. PATENT DOCUMENTS

| | | | |
|---|---|---|---|
| 9,871,300 | B1 | 1/2018 | Lee et al. |
| 2010/0141517 | A1 | 6/2010 | Surittikul |
| 2015/0280325 | A1 | 10/2015 | Rofougaran |

FOREIGN PATENT DOCUMENTS

| | | | | | |
|---|---|---|---|---|---|
| CN | 109256617 | A | | 1/2019 | |
| CN | 110611161 | A | | 12/2019 | |
| CN | 110611164 | A | | 12/2019 | |
| CN | 210628481 | U | | 5/2020 | |
| CN | 112768892 | A | | 5/2021 | |
| GB | 2540800 | A | * | 2/2017 | ............. H01Q 21/06 |
| JP | 2007142721 | A | | 6/2007 | |
| TW | 516253 | B | | 1/2003 | |

* cited by examiner

ANTENNA AND ELECTRONIC DEVICE

TECHNICAL FIELD

The present disclosure belongs to the technical field of communication, and particularly relates to an antenna and an electronic device.

BACKGROUND

With a rapid development in the information age, a wireless terminal with high integration, miniaturization, multifunction, and low cost has gradually become a trend of communication technology. The performance of an antenna, which is an important part in wireless communication, directly affects the quality of information communication, and the antenna is developing towards ultra wide band, function diversification, miniaturization and intellectualization in order to meet the requirements of technological and industrial developments.

SUMMARY

The present disclosure aims to solve at least one technical problem in the prior art and provides an antenna and an electronic device.

In a first aspect, an embodiment of the present disclosure provides an antenna, including a dielectric layer, and a first radiation patch, at least one second radiation patch and a feeding unit, which are on the dielectric layer, where the feeding unit is electrically connected to the first radiation patch, and each of the at least one second radiation patch is connected to the first radiation patch through at least one switch unit,

- where a side edge of the first radiation patch is provided with at least one first opening;
- each of the at least one switch unit includes a signal electrode and a membrane bridge; the signal electrode includes a first end and a second end which are opposite to each other; the first end of the signal electrode is electrically connected to the second radiation patch, and an orthographic projection of the second end of the signal electrode on the dielectric layer is within an orthographic projection of one of the at least one first opening on the dielectric layer; the membrane bridge spans the one of the at least one first opening and is electrically connected to the first radiation patch; in the switch unit, an orthographic projection of the signal electrode on the dielectric layer overlaps an orthographic projection of the membrane bridge on the dielectric layer, and a first insulating layer is on a surface of the signal electrode close to the membrane bridge.

In some examples, the first radiation patch includes a first side edge and a second side edge extending in a first direction and opposite to each other in a second direction; the second radiation patch is connected to the second side edge of the first radiation patch through the at least one switch unit; the at least one second radiation patch includes a plurality of second radiation patches, which are arranged side by side along the first direction, and a length of at least one of the plurality of second radiation patches in the second direction is different from lengths of others of the plurality of second radiation patches in the second direction.

In some examples, the at least one switch unit connected to the second radiation patch includes a plurality of switch units.

In some examples, lengths of the plurality of second radiation patches in the second direction are different from each other, and monotonically increase or decrease along the first direction.

In some examples, lengths of the plurality of second radiation patches in the first direction are equal to each other, and each of the plurality of second radiation patches is connected to the first radiation patch through a same number of switch units.

In some examples, a variation trend of lengths of the plurality of second radiation patches in the second direction is the same as a variation trend of lengths of the plurality of second radiation patches in the first direction.

In some examples, the number of the at least one switch unit connected to the second radiation patch is positively correlated with a length of the second radiation patch in the first direction.

In some examples, the first radiation patch includes a first side edge and a second side edge extending in a first direction and opposite to each other in a second direction; the second radiation patch is connected to the second side edge of the first radiation patch through the at least one switch unit; the at least one second radiation patch includes a plurality of second radiation patches, which are arranged side by side along the first direction, and lengths of the plurality of second radiation patches in the first direction are equal to each other, and lengths of the plurality of second radiation patches in the second direction are equal to each other.

In some examples, each of the plurality of second radiation patches is connected to the first radiation patch through a same number of switch units.

In some examples, areas of orthographic projections of the membrane bridges in the switch units on the dielectric layer are equal to each other, areas of orthographic projections of the signal electrodes in the switch units on the dielectric layer are equal to each other, and thicknesses of the first insulating layers in the switch units connecting to different second radiation patches are different from each other.

In some examples, thicknesses of the first insulating layers in the switch units are equal to each other, areas of orthographic projections of the membrane bridges in the switch units connecting to different second radiation patches on the dielectric layer are different from each other, and areas of orthographic projections of the signal electrodes in the switch units connecting to different second radiation patches on the dielectric layer are different from each other.

In some examples, the feeding unit and the switch unit are connected to different side edges of the first radiation patch, respectively.

In some examples, the feeding unit is connected to the first side edge of the first radiation patch.

In some examples, a connection line of orthographic projections of side edges of the plurality of second radiation patches on the dielectric layer forms a first line segment, where the side edges of the plurality of second radiation patches are connected to the signal electrodes, respectively, a connection line of orthographic projections of two end points of the second side edge of the first radiation patch on the dielectric layer forms a second line segment, and the first line segment and the second line segment are aligned end to end.

In some examples, the feeding unit includes a microstrip line, and the microstrip line and the first radiation patch have a one-piece structure.

In some examples, an extending direction of the microstrip line passes through a center of the first radiation patch.

In some examples, the first radiation patch and the at least one second radiation patch have a one-piece structure.

In some examples, the signal electrode and the second radiation patch connected to the signal electrode have a one-piece structure.

In some examples, the first radiation patch is provided with a second opening, and an orthogonal projection of the feeding unit on the dielectric layer is within an orthogonal projection of the second opening on the dielectric layer.

In some examples, the membrane bridge includes a bridge deck, and a first connecting arm and a second connecting arm connected at both ends of the bridge deck, respectively; an orthographic projection of the bridge deck on the dielectric layer crosses an orthographic projection of the one of the at least one first openings on the dielectric layer; and the first connecting arm and the second connecting arm are each directly connected to the first radiation patch.

In some examples, an orthographic projection of the membrane bridge on the dielectric layer spans an orthographic projection of the one of the at least one first openings on the dielectric layer, in a first direction; and a length of the orthographic projection of the membrane bridge on the dielectric layer in the first direction is in a range of 0.1 μm to 500 μm.

In some examples, a thickness of the first insulating layer in a direction away from the dielectric layer is in a range of 0.001 μm to 100 μm.

In some examples, the antenna further includes a reference electrode layer on a side of the dielectric layer away from the first radiation patch; and an orthographic projection of the reference electrode layer on the dielectric layer covers orthographic projections of the first radiation patch, the at least one second radiation patch, the feeding unit and the switch units on the dielectric layer.

In a second aspect, an embodiment of the present disclosure provides an electronic device, which includes any one of the antennas described above.

DETAIL DESCRIPTION OF EMBODIMENTS

In order to enable one of ordinary skill in the art to better understand the technical solutions of the present disclosure, the present disclosure will be further described in detail below with reference to the accompanying drawings and specific embodiments.

Unless defined otherwise, technical or scientific terms used herein shall have the ordinary meaning as understood by one of ordinary skill in the art to which this disclosure belongs. The use of “first”, “second”, and the like in the present disclosure is not intended to indicate any order, quantity, or importance, but rather serves to distinguish one element from another. Also, the term “a”, “an”, “the” or the like does not denote a limitation of quantity, but rather denotes the presence of at least one. The word “comprising”, "comprises", or the like, means that the element or item preceding the word includes the element or item listed after the word and its equivalent, but does not exclude other elements or items. The term "connected", "coupled" or the like is not restricted to physical or mechanical connections, but may include electrical connections, whether direct or indirect. The terms "upper", "lower", "left", "right", and the like are used only to indicate relative positional relationships, and when the absolute position of the object being described is changed, the relative positional relationships may also be changed accordingly.

Generally, the number of antenna units may be increased to improve the performance of the antenna, but too many antenna units will cause electromagnetic interference among them, and at the same time, the size of the antenna will be too large, which is not favorable for miniaturization. A frequency reconfigurable antenna may enable the frequency of the antenna to be reconfigurable within a certain range by adding a control switch, and is characterized in that a resonant frequency of the antenna may be adjusted without increasing or reducing the number of radiation units of the antenna, so that the frequency reconfigurable antenna has the advantages of simple structure and small occupied space. Generally, the frequency reconfiguration may be realized by adopting a semiconductor switch, a variable capacitance diode, a liquid crystal, an MEMS (Micro-electromechanical Systems) switch or the like as the control switch. However, the semiconductor switch or the variable capacitance diode has obvious influence on gain and efficiency indicators of the antenna, and the liquid crystal reconfigurable antenna has a long response time. Compared with other switches, the MEMS switch has obvious advantages in insertion loss, power consumption, volume, cost and the like.

Figure 1A:
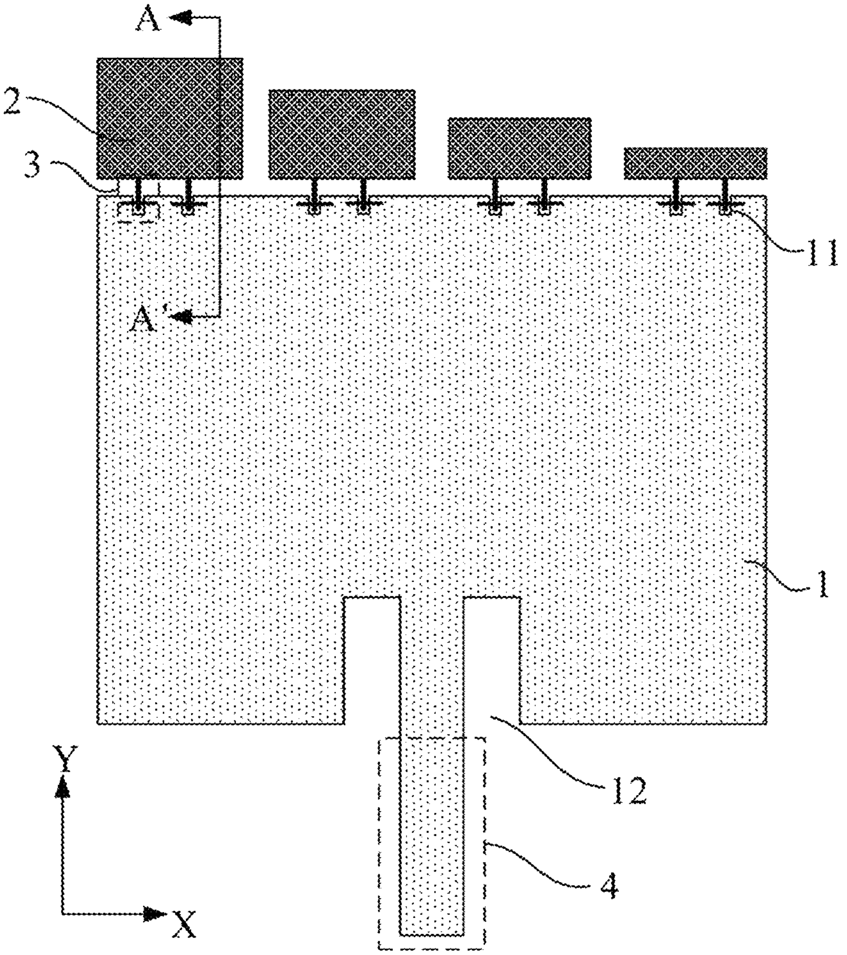
FIG. 1*a* is a top view of an antenna according to an embodiment of the present disclosure.
Figure 6:
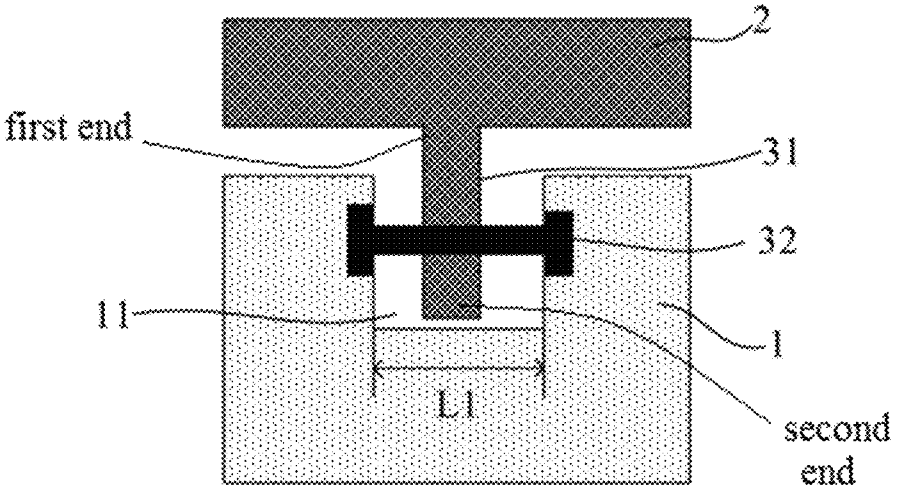
FIG. 6 is a top view of a part of an antenna in a first example at a position of an MEMS switch according to an embodiment of the present disclosure.

FIG. 1*a* is a top view of an antenna according to an embodiment of the present disclosure. In a first aspect, as shown in FIG. 1*a*, the present disclosure provides an antenna, an operating frequency of which is reconfigurable. The antenna may include a dielectric layer 10, and a first radiation patch 1, at least one second radiation patch 2 and a feeding unit 4 disposed on the dielectric layer 10. The feeding unit 4 is electrically connected to the first radiation patch 1. Each second radiation patch 2 is connected to the first radiation patch 1 through at least one switch unit 3 therebetween. Specifically, a side edge of the first radiation patch 1 is provided with at least one first opening 11, which may be disposed in a one-to-one correspondence with the at least one switch unit 3. Each switch unit 3 includes a signal electrode 31 and a membrane bridge 32. The signal electrode 31 includes a first end and a second end which are oppositely arranged along a length direction of the signal electrode (as shown in FIG. 6). The first end of the signal electrode 31 is connected to the second radiation patch 2, and an orthographic projection of the second end of the signal electrode 31 on the dielectric layer 10 is within an orthographic projection of the first opening 11 on the dielectric layer 10. The membrane bridge 32 spans the first opening 11 and is electrically connected to the first radiation patch 1. The signal electrode 31 in the switch unit 3 is located in a space enclosed by the membrane bridge 32 and the first opening 11, and an orthographic projection of the signal electrode 31 on the dielectric layer 10 overlaps an orthographic projection of the membrane bridge 32 on the dielectric layer 10. A first insulating layer 5 is arranged on a surface of the signal electrode 31 close to the membrane bridge 32.

In the embodiment of the present disclosure, the first radiation patch 1 and the second radiation patch 2 are provided with the switch unit 3 therebetween, the first radiation patch 1 is connected to the membrane bridge 32 of the switch unit 3, and the second radiation patch 2 is connected to the signal electrode 31 of the switch unit 3, so that a state of the switch unit 3 may be controlled according to voltages applied to the first radiation patch 1 and the second radiation patch 2, so as to change a capacitance between the first radiation patch 1 and the second radiation patch 2, and further realize the reconfiguration of the operating frequency of the antenna.

Figure 1B:
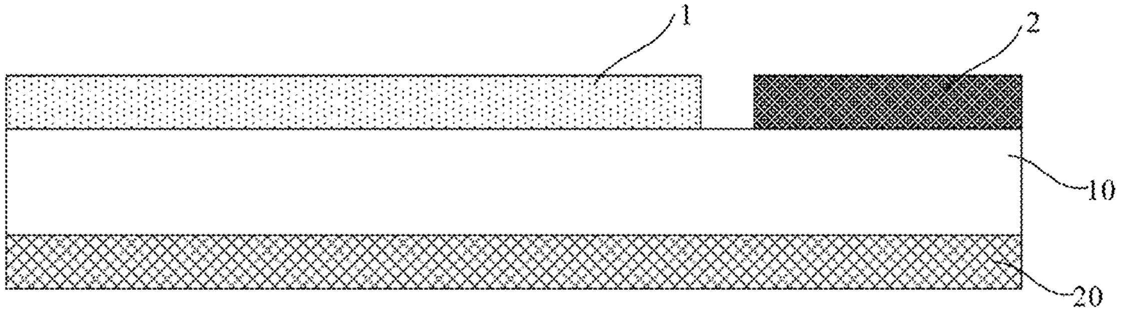
FIG. 1*b* is a cross-sectional view taken along A-A' in FIG. 1*a*.

FIG. 1*b* is a cross-sectional view taken along A-A' in FIG. 1*a*. In some examples, as shown in FIG. 1*b*, the antenna according to an embodiment of the present disclosure includes not only the above described structure, but also a reference electrode layer 20 disposed on a side of the dielectric layer 10 away from the first radiation patch 1. The reference electrode layer 20 is configured to form a current loop with the first radiation patch and the second radiation patch when the antenna is in operation. The reference electrode layer 20 according to an embodiment of the present disclosure includes, but is not limited to, a ground electrode.

Figure 2:
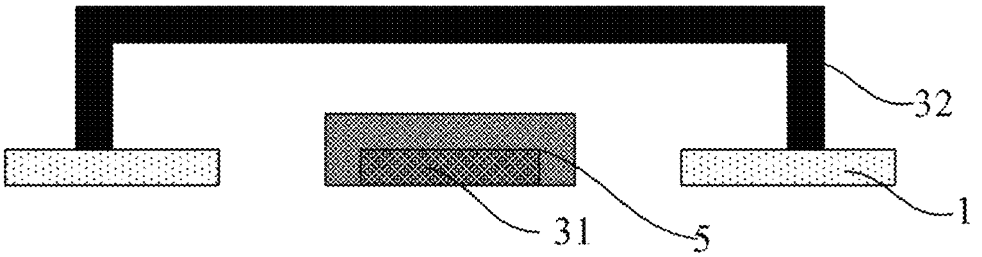
FIG. 2 is a schematic diagram of an antenna with a MEMS switch in an open state according to an embodiment of the present disclosure.
Figure 3:
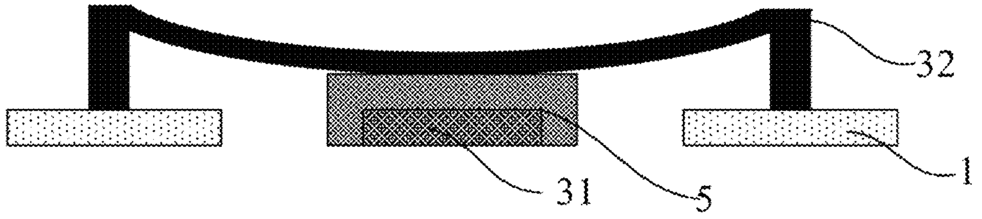
FIG. 3 is a schematic diagram of an antenna with a MEMS switch in a closed state according to an embodiment of the present disclosure.

In some examples, the switch unit 3 may be a MEMS switch, where the membrane bridge 32 includes a bridge deck, and a first connecting arm and a second connecting arm connected to both ends of the bridge deck, and a surface of the signal electrode 31 opposite to the bridge deck is provided with the first insulating layer 5. An orthographic projection of the bridge deck of one membrane bridge 32 on the dielectric layer 10 spans an orthographic projection of one first opening on the dielectric layer 10. The first connecting arm and the second connecting arm are directly connected to the first radiation patch 1, and the second radiation patch 2 is connected to the signal electrode 31. FIG. 2 is a schematic diagram of an antenna with an MEMS switch in an open state according to an embodiment of the present disclosure, and FIG. 3 is a schematic diagram of an antenna with an MEMS switch in a closed state according to an embodiment of the present disclosure. As shown in FIGS. 2 and 3, when a same voltage is applied to the first radiation patch 1 and the second radiation patch 2, there is no electric field between the signal electrode 31 and the bridge deck of the membrane bridge 32, and the MEMS switch is in an open state. When different voltages are applied to the first radiation patch 1 and the second radiation patch 2, respectively, an electric field is generated between the signal electrode 31 and the bridge deck of the membrane bridge 32, the bridge deck of the membrane bridge 32 is driven to move in a direction perpendicular to the signal electrode 31, and the MEMS switch is in a closed state. For example, by inputting a direct current bias voltage to the membrane bridge 32, a distance between the bridge deck of the membrane bridge 32 and the signal electrode 31 may be changed, thereby a capacitance of a capacitor formed by the bridge deck of the membrane bridge 32 and the signal electrode 31 may be changed, and a capacitance of a capacitor between the first radiation patch 1 and the second radiation patch 2 may be changed.

It should be noted that the switch unit 3 in the embodiment of the present disclosure is not limited to the MEMS switch, and the switch unit 3 may alternatively be a cantilever switch. Compared to the MEMS switch, the membrane bridge 32 of the cantilever switch includes only one of the first connecting arm and the second connecting arm, and other structures and operating principles are the same as those of the MEMS switch, and therefore are not described herein again. In the following, only the switch unit 3 being a MEMS switch is taken as an example for description.

In some examples, the bridge deck, the first connecting arm, and the second connecting arm of the membrane bridge 32 are all made of a metal material. Alternatively, the bridge deck may be made of a different material from the first connecting arm and the second connecting arm. For example, the bridge deck is made of a metal material, and the first connecting arm and the second connecting arm are made of an insulating material. In an embodiment of the present disclosure, the bridge deck, the first connecting arm, and the second connecting arm of the membrane bridge 32 are all made of a metal material and have a one-piece structure. In this case, the first connecting arm and the second connecting arm are directly connected to the first radiation patch 1, so that no separate wiring is required to apply a voltage to the bridge deck to control the MEMS switch, and thus an integration level of the antenna is higher.

Further, a width of the bridge deck of the membrane bridge 32 of the MEMS switch is approximately in a range of 0.1 μm to 500 μm. The width of the bridge deck of the membrane bridge 32 means a width of the bridge deck of the membrane bridge 32 in a first direction X in a case where the membrane bridge 32 spans the first opening in the first direction X. A yield and a stability of the MEMS switch may be adjusted by adjusting the width of the bridge deck. The smaller the width of the bridge deck is, the more effectively the yield and the stability of the MEMS switch can be improved.

Further, a thickness of the first insulating layer 5 between the signal electrode 31 and the membrane bridge 32 of the MEMS switch is in a range of 0.001 μm to 100 μm. The capacitance between the first radiation patch 1 and the second radiation patch 2 may be changed by adjusting the thickness of the first insulating layer 5, thereby affecting a coupling efficiency between the first radiation patch 1 and the second radiation patch 2, and further adjusting a resonant frequency of the antenna as a whole.

In some examples, shapes of the first radiation patch 1 and the second radiation patch 2 in the antenna may be the same or different. The first radiation patch 1 and the second radiation patch 2 each may adopt a rectangular shape, a circular shape, an elliptical shape, a regular polygonal shape, or the like. The first radiation patch 1 and the second radiation patch 2 are described as rectangular patches in the embodiments of the present disclosure, but it should be understood that this does not limit the protection scope of the embodiments of the present disclosure. With continued reference to FIG. 1*a*, where the first radiation patch 1 and the second radiation patch 2 each adopt a rectangular patch, each of the first radiation patch 1 and the second radiation patch 2 includes a first side edge and a second side edge extending along the first direction X and oppositely disposed in a second direction Y, and a third side edge and a fourth side edge extending along the second direction Y and oppositely disposed in the first direction X. Further, the feeding unit 4 may be connected to the first side edge of the first radiation patch 1. The first opening 11 is formed at the second side edge of the first radiation patch 1, that is, the switch unit 3 is connected to the second side edge of the first radiation patch 1. Each second radiation patch 2 is located on a side of the second side edge of the first radiation patch 1 away from the first side edge. With such an arrangement, a transmission path of a microwave signal can be effectively extended. The greater the length of the second radiation patch 2 in the second direction Y is, the lower a radiation frequency of the antenna is when the MEMS switch is in a closed state.

Figure 4:
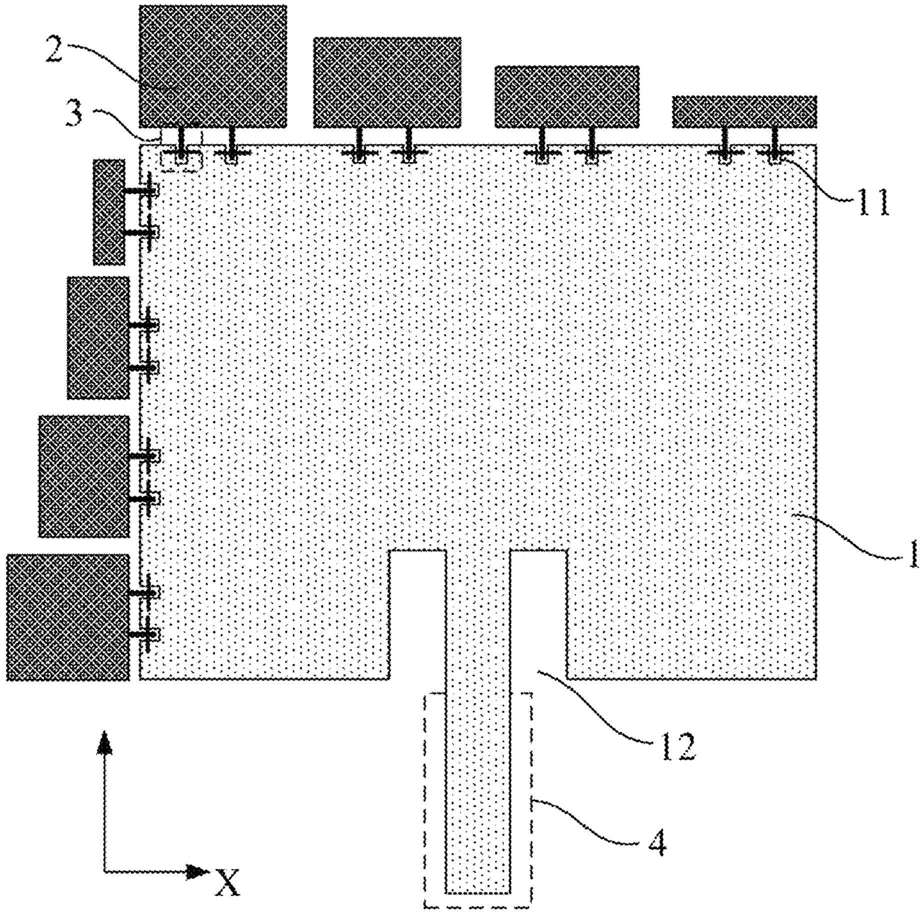
FIG. 4 is a top view of another antenna according to an embodiment of the present disclosure.
Figure 5:
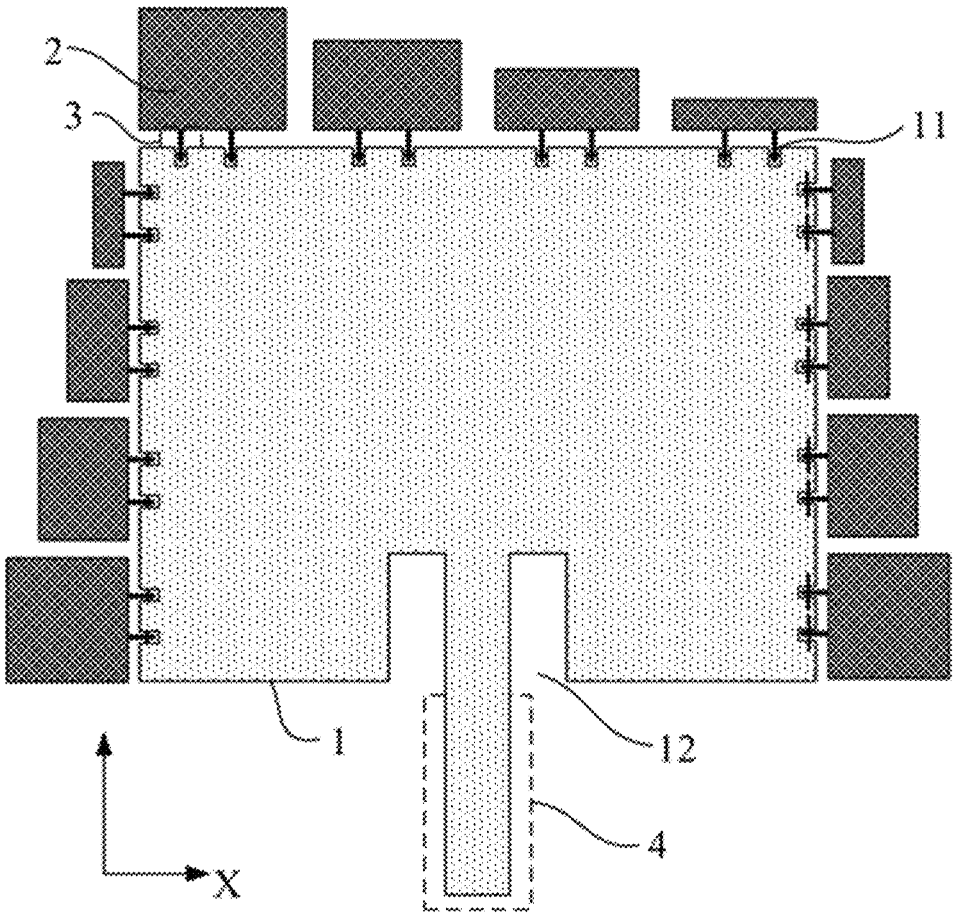
FIG. 5 is a top view of another antenna according to an embodiment of the present disclosure.

FIG. 4 is a top view of another antenna according to an embodiment of the present disclosure; and FIG. 5 is a top view of yet another antenna according to an embodiment of the present disclosure. In some examples, as shown in FIGS. 4 and 5, the second radiation patch 2 may alternatively be connected to the third side edge and/or the fourth side edge of the first radiation patch 1 through a switch unit, or the second radiation patches may be connected to at least two of the second side edge, the third side edge, and the fourth side edge of the first radiation patch 1 through switch units. Alternatively, the second radiation patch 2 may be connected to each side edge of the first radiation patch 1 through a switch unit 3 (this case is not shown in the figures). The above situations are all within the protection scope of the embodiments of the present disclosure. No matter whether the second radiation patch 2 is arranged at any one or more side edges of the first radiation patch 1 through the switch unit 3, as long as the open state or the closed state of the switch unit 3 is controlled, the transmission path of the microwave signal may be controlled, and thus the frequency reconfiguration of the antenna can be realized. Where the second radiation patches 2 are arranged at a plurality of side edges of the first radiation patch 1 through the switch units 3, the microwave signal may be transmitted by simultaneously selecting the second radiation patches 2 at different side edges, so that the transmission path of the microwave signal is changed, and the antenna can be realized to have more selectable frequencies.

In addition, where the second radiation patches 2 are disposed at a plurality of side edges of the first radiation patch 1 through the switch units 3, the number of the second radiation patches 2 connected to each side edge may be the same or different, and sizes of the second radiation patches 2 connected to each side edge may be changed in the same or different manner. In the embodiment of the present disclosure, the number, shape, and size of the second radiation patche 2 at each side edge are not limited.

In some examples, a microstrip line is made of, but not limited to, aluminum, silver, gold, chromium, molybdenum, nickel, or iron.

In some examples, a first side edge of each second radiation patch 2 is connected to the signal electrode 31, a connection line of the orthographic projections of the first side edges of the second radiation patches 2 on the dielectric layer 10 is a first line segment, a connection line of the orthographic projections of two end points of the second side edge (or the first side edge) of the first radiation patch 1 on the dielectric layer 10 is a second line segment, and the first line segment and the second line segment are aligned with each other end to end. Such an arrangement is beneficial to reducing the size of the antenna and realizing the miniaturization of the antenna.

In some examples, with continued reference to FIG. 1*a*, the feeding unit 4 may be a microstrip line, which may be connected to the first side edge of the first radiation patch 1. Preferably, the first radiation patch 1 and the microstrip line have a one-piece structure. In this way, the transmission insertion loss and the return loss of the microwave signal may be reduced. In one example, where a microstrip line is used as the feeding unit 4, an extending direction of the microstrip line passes through a center of the first radiation patch 1, so as to improve the transmission efficiency of the microwave signal.

Further, with continued reference to FIG. 1*a*, in order to match the impedance between the microstrip line and the first radiation patch 1 and reduce insertion loss and return loss, a second opening 12 may be formed at a side edge of the first radiation patch 1. In one example, an orthographic projection of the microstrip line on the dielectric layer 10 is within an orthographic projection of the second opening 12 on the dielectric layer 10. Further, the microstrip line divides the second opening 12 into two parts with equal areas. In another example, the second openings 12 are formed at a first side edge of the first radiation patch 1, and the second openings 12 are provided on both sides of a position where the microstrip line is connected to the first radiation patch 1. Such an arrangement may reduce the insertion loss and return loss to the maximum extent. Alternatively, in some examples, the second opening 12 may be provided at the third side edge or the fourth side edge of the first radiation patch 1.

In some examples, one second radiation patch 2 or a plurality of second radiation patches 2 may be provided in the antenna. In an example, a plurality of second radiation patches 2 are provided, and in this case, the antenna with more reconfigurable operating frequencies can be realized. In the embodiment of the present disclosure, only an example of a plurality of second radiation patches 2 is given (specifically, detailed description is given in the following example). Alternatively, only one second radiation patch 2 may be included in an actual product.

In some examples, each second radiation patch 2 may be connected to the first radiation patch 1 through one switch unit 3, or through a plurality of switch units 3. In an example, each second radiation patch 2 is connected to the first radiation patch 1 through a plurality of switch units 3, so that the coupling efficiency of the microwave signal can be improved when the switch units 3 are in a closed state. Further, where a plurality of second radiation patches 2 are provided in the antenna, the number of the switch units connected to different radiation patches 2 may be the same or different. For example, the greater an area of the second radiation patch 2 is, the more switch units are connected to the second radiation patch 2. For example, the greater the length of the second radiation patch 2 in the first direction X is, the more switch units are connected to the second radiation patch 2.

In some examples, where a plurality of second radiation patches 2 are provided in the antenna, the sizes of the second radiation patches 2 may be the same or different. For example, the lengths of the second radiation patches in the first direction X are the same, and the lengths of the second radiation patches in the second direction Y are different from each other. Alternatively, the lengths of the second radiation patches in the first direction Y are the same, and the lengths of the second radiation patches in the second direction X are different from each other. Where the sizes of the second radiation patches 2 are different from each other, the antenna with more reconfigurable operating frequencies may be realized.

In some examples, the first radiation patch 1 and the second radiation patch 2 in the antenna are arranged in a same layer and made of a same material, which contributes to thinning and lightening of the antenna. Further, the first radiation patch 1 and the second radiation patch 2 are arranged in the same layer and made of the same material, so that the first radiation patch 1 and the second radiation patch 2 of the antenna may be formed in one patterning process, thereby reducing the process steps and saving the production cost. In addition, the thicknesses of the first radiation patch and the second radiation patch may be the same or different, and the first radiation patch and the second radiation patch having a same thickness are taken as an example for description in each of the embodiments of the present disclosure.

In some examples, the dielectric layer 10 may be made of a plurality of materials. For example, if the dielectric layer 10 is a flexible substrate, the material of the dielectric layer 10 may include at least one of polyethylene glycol terephthalate (PET) and Polyimide (PI). If the dielectric layer is a rigid substrate, the material of the dielectric layer 10 may alternatively be glass, or the like.

FIG. **6*b* shows orthographic projections of various components of the antenna shown in FIG. 1*a* on a dielectric layer. FIG. 6*c* shows orthographic projections of various components of the antenna shown in FIG. 4 on a dielectric layer. FIG. 6*d* shows orthographic projections of various components of the antenna shown in FIG. 5 on a dielectric layer. FIGS. 6*b* to 6*d* each show orthographic projections 1', 2', 3', 4', 11', and 12' of the first radiation patch 1, the second radiation patch 2, the switch unit 3, the feeding unit 4, the first opening 11, and the second opening 12 on the dielectric layer. FIGS. 6*b* to 6*d* each further show: a first line segment, that is, a connection line of the orthographic projections of the first side edges of the second radiation patches 2 on the dielectric layer; and a second line segment, that is, a connection line of the orthographic projections of two end points of the second side edge of the first radiation patch 1** on the dielectric layer.

In order to make the structure of the antenna according to the embodiments of the present disclosure clearer, the following description is made with reference to specific examples. In the following examples, the first radiation patch 1 is a rectangular patch having a first opening 11 and a second opening 12, and the first opening 11 and the second opening 12 are both rectangular. Meanwhile, the second radiation patch 2 also adopts a rectangular patch. The switch unit 3 adopts a MEMS switch. The feeding unit 4 is a microstrip line. A length of the first radiation patch 1 in the first direction X is referred to as a width of the first radiation patch 1, and a length of the first radiation patch 1 in the second direction Y is referred to as a length of the first radiation patch 1. Similarly, a length of the second radiation patch 2 in the first direction X is referred to as a width of the second radiation patch 2, and a length of the second radiation patch 2 in the second direction Y is referred to as a length of the second radiation patch 2.

Figure 7:
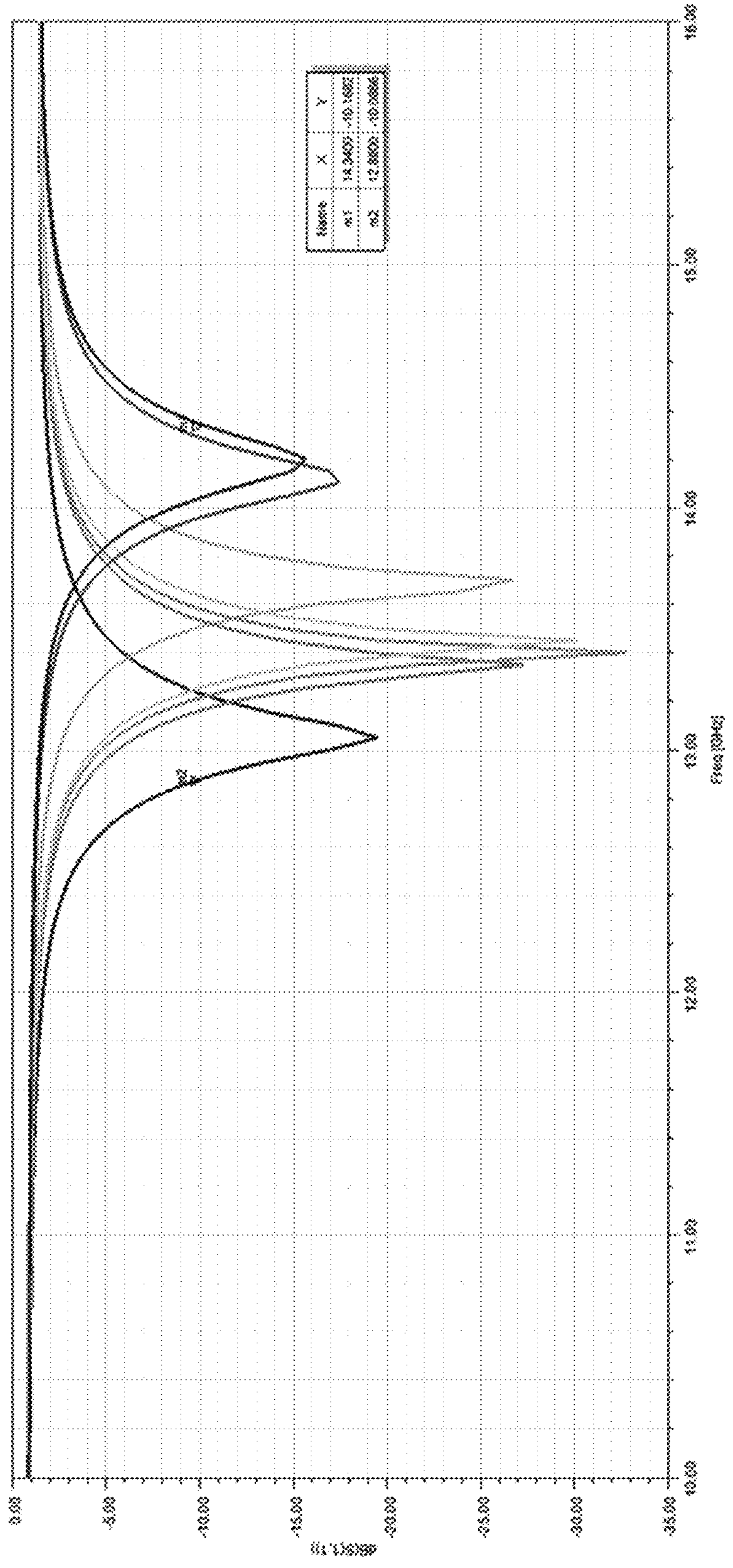
FIG. 7 is a frequency simulation diagram of an antenna in a first example according to an embodiment of the present disclosure.
Figure 8:
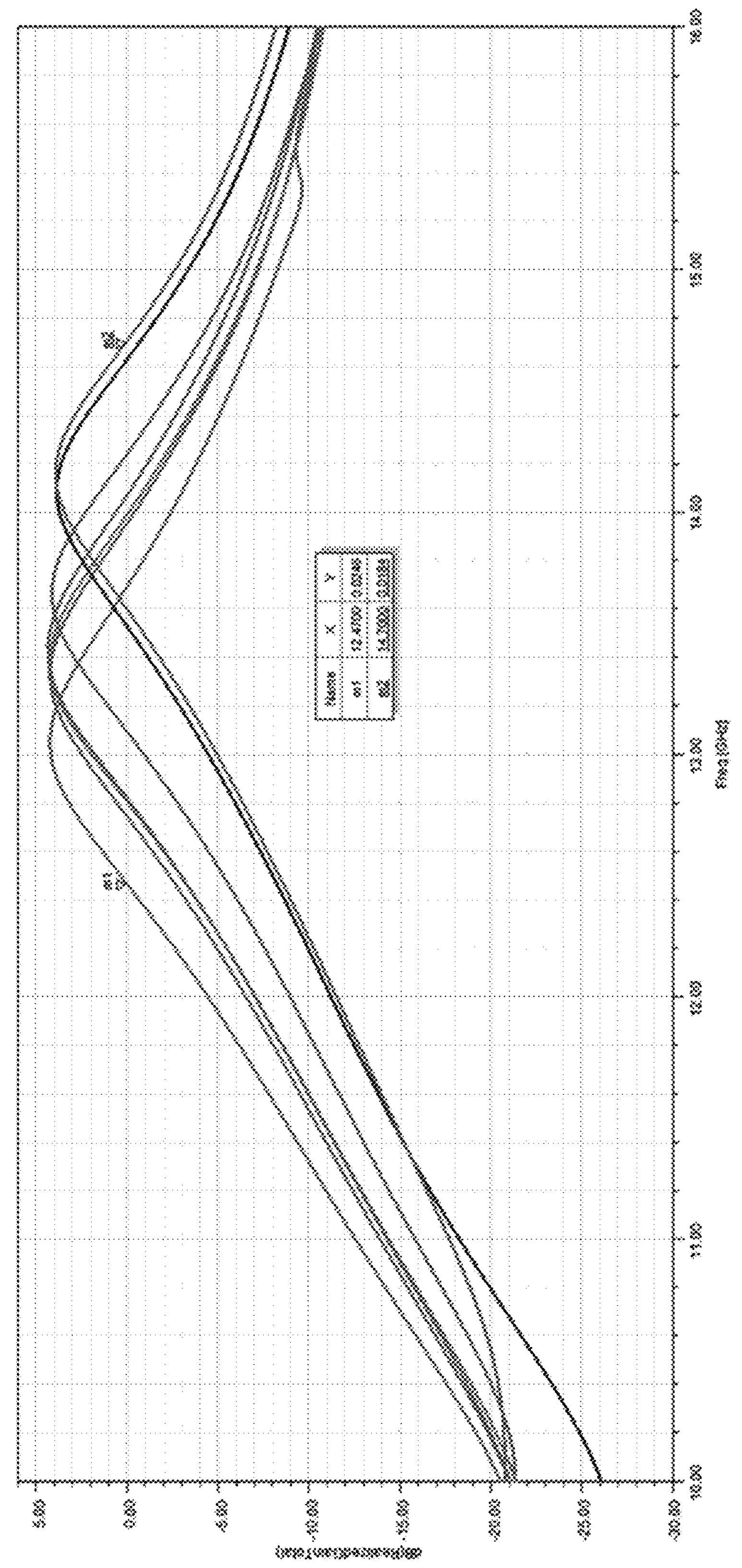
FIG. 8 is a gain simulation diagram of an antenna in a first example according to an embodiment of the present disclosure.

A first example: FIG. 6 is a top view of a part of an antenna in the first example at a position of an MEMS switch according to an embodiment of the present disclosure. As shown in FIGS. **1*a* and 6, the antenna includes a first radiation patch 1 and a plurality of second radiation patches 2, each of which is connected to the first radiation patch 1 through a plurality of MEMS switches. In FIG. 1*a*, as an example, the number of the second radiation patches 2 is four, each second radiation patch 2 is connected to the first radiation patch 1 through two MEMS switches, and the width L1 of the bridge deck of the membrane bridge 32 is 108 μm. The second radiation patches 2 are arranged side by side along the first direction X, and the widths of the second radiation patches 2 are equal, and the lengths of the second radiation patches 2 are monotonically decreased or monotonically increased along the first direction X. For example, the lengths of the second radiation patches 2 in FIG. 1*a* decrease from left to right, that is, the areas of the second radiation patches 2 decrease from left to right. Specifically, in the first direction X, the lengths of the second radiation patches 2 decrease from left to right, and a ratio of the length of one of two adjacent second radiation patches 2 to a length of the other is approximately in a range of 5:4 to 2:1, for example, the ratio is 2:1. FIG. 7 is a frequency simulation diagram of the antenna in the first example according to an embodiment of the present disclosure, and FIG. 8 is a gain simulation diagram of the antenna in the first example according to an embodiment of the present disclosure. As the number of the MEMS switches in the closed state is gradually increased, the area of the second radiation patches 2 participating in radiation also gradually increases, the impedance bandwidth/gain bandwidth gradually shifts left, the −10 dB impedance bandwidth is in a range of 12.88 GHz to 14.34 GHz (obtained according to points m1 and m2 in FIG. 7), the gain bandwidth is in a range of 12.47 GHz to 14.7 GHZ (obtained from according to points m1 and m2 in FIG. 8**), and the antenna gain is approximately 4.2 dB. The simulation results show that the frequency reconfiguration may be realized by controlling the state of the MEMS switch, and the resonant frequency of the antenna is continuously adjustable in the Ku wave band.

Figure 6A:
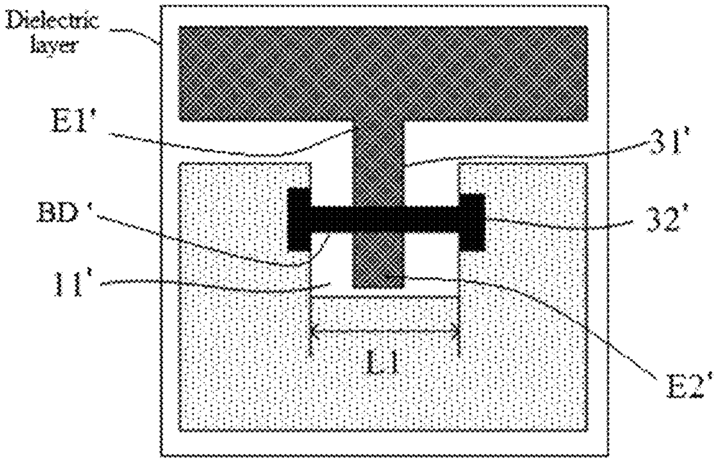
FIG. 6*a* shows orthographic projections of various components of the antenna shown in FIG. 6 on a dielectric layer.
Figure 6B:
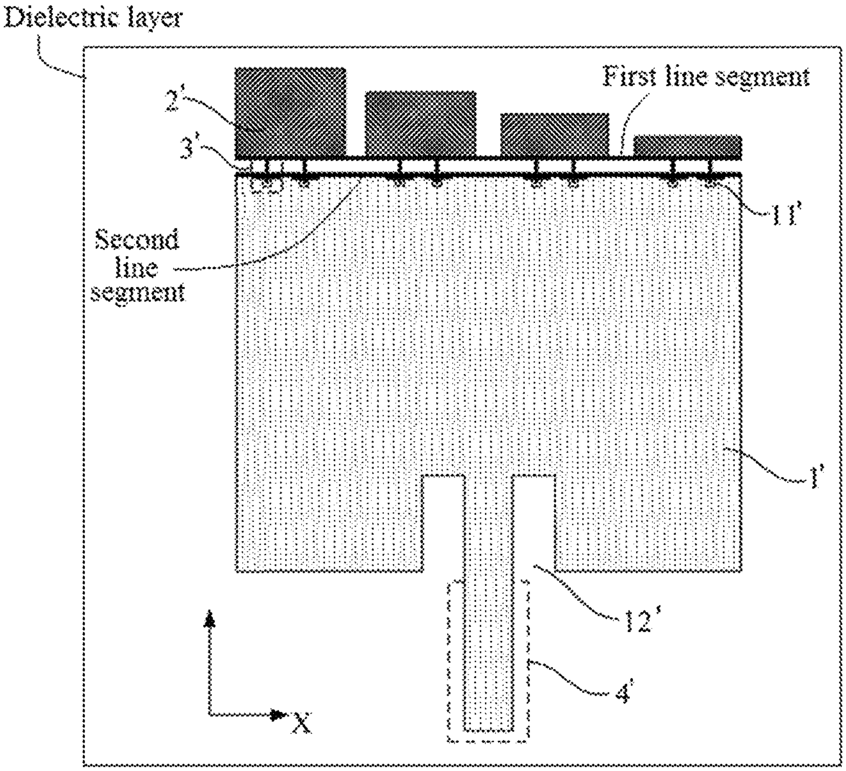
FIG. 6*b* shows orthographic projections of various components of the antenna shown in FIG. 1*a* on a dielectric layer.
Figure 6C:
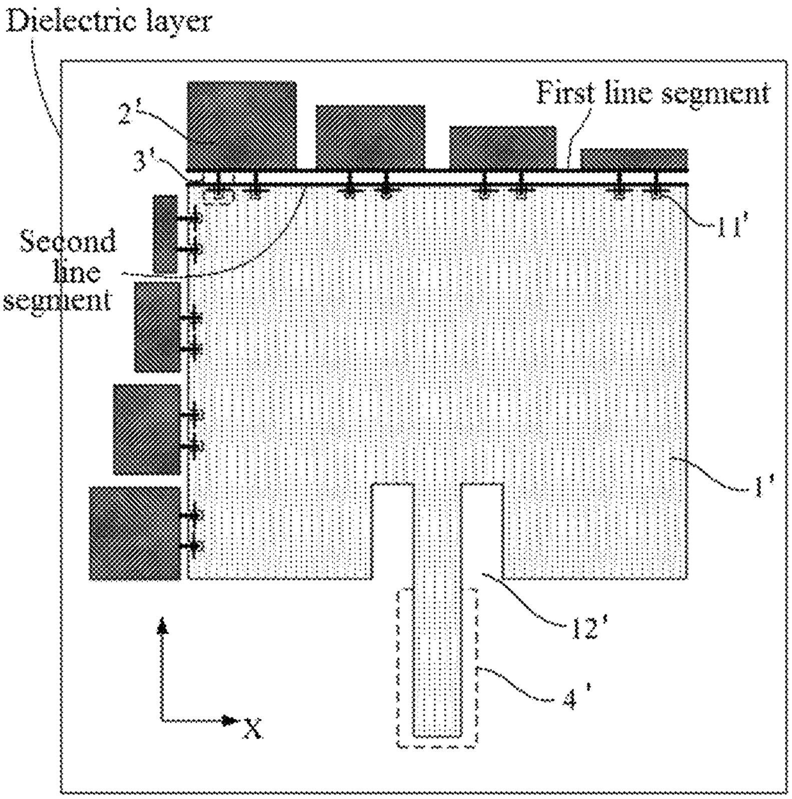
FIG. 6*c* shows orthographic projections of various components of the antenna shown in FIG. 4 on a dielectric layer.
Figure 6D:
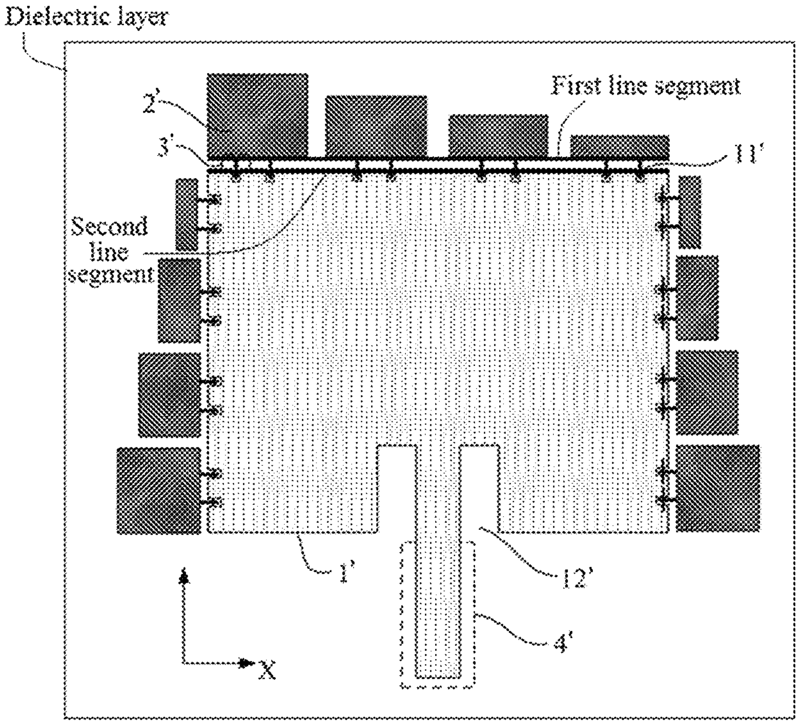
FIG. 6*d* shows orthographic projections of various components of the antenna shown in FIG. 5 on a dielectric layer.

FIG. 6*a* shows orthographic projections of various components of the antenna shown in FIG. 6 on a dielectric layer. FIG. 6*a* shows orthographic projections 1', 2', 11', 31', and 32' of the first radiation patch 1, the second radiation patch 2, the first opening 11, the signal electrode 31, and the membrane bridge 32 on the dielectric layer. The orthographic projections 31' of the signal electrode 31 on the dielectric layer includes an orthographic projections E1' of the first end on the dielectric layer and an orthographic projections E2' of the second end on the dielectric layer. The orthographic projection 32' of the membrane bridge 32 on the dielectric layer includes an orthogonal projection of the bridge deck on the dielectric layer.

Figure 9:
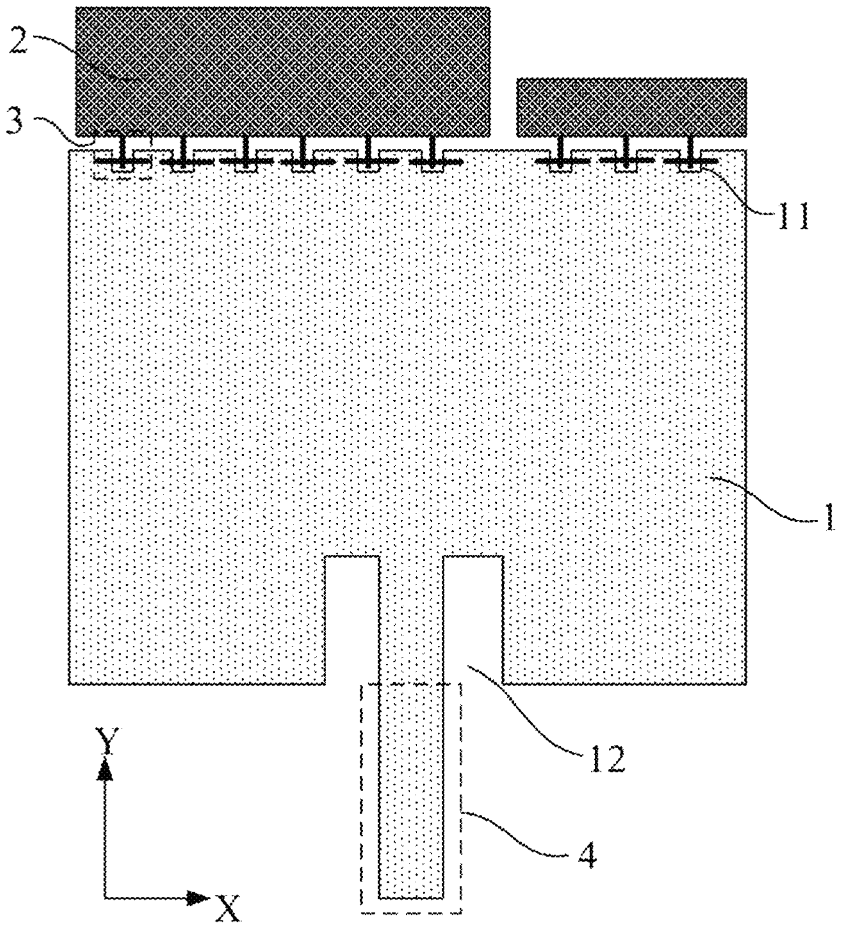
FIG. 9 is a top view of an antenna in a second example according to an embodiment of the present disclosure.
Figure 10:
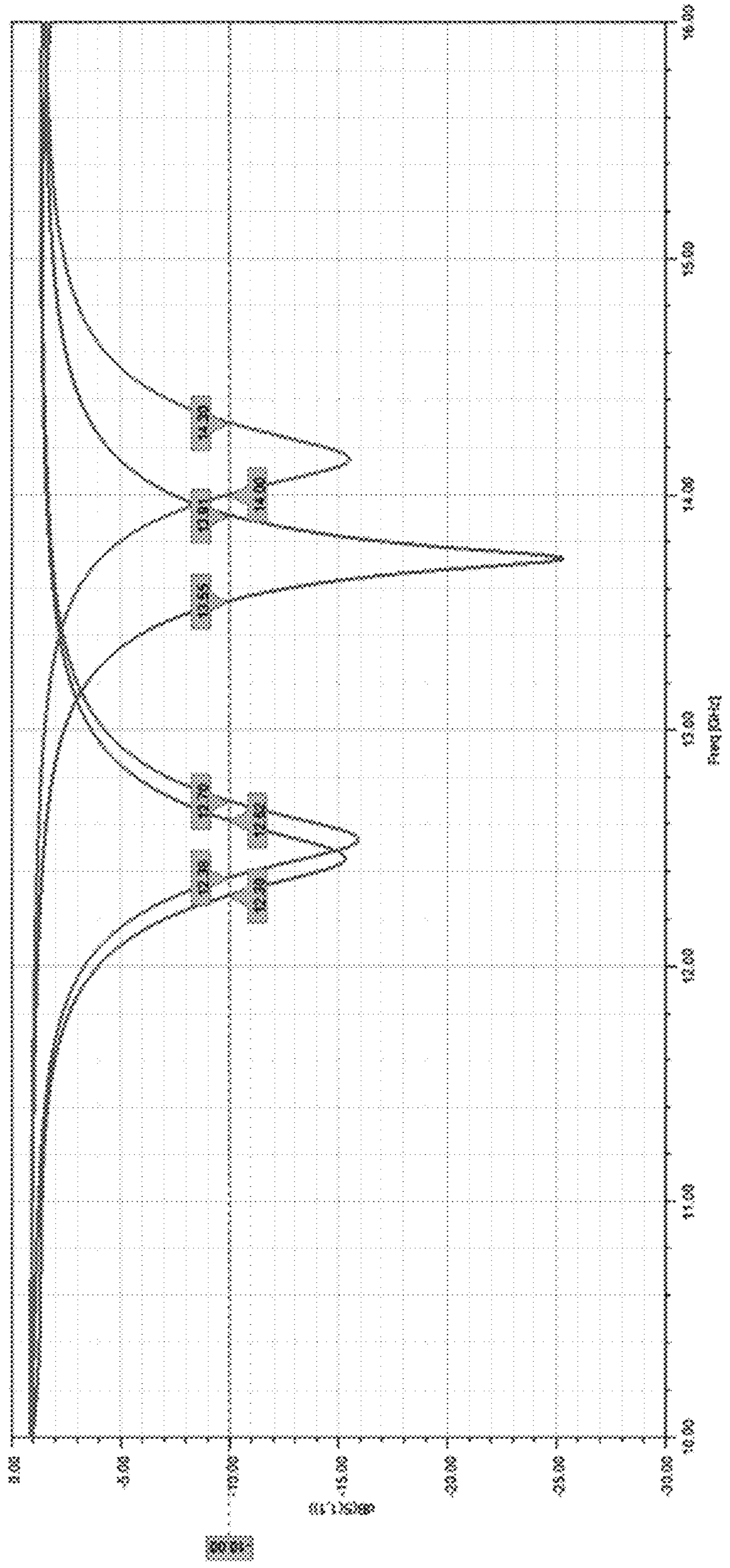
FIG. 10 is a frequency simulation diagram of an antenna in a second example according to an embodiment of the present disclosure.
Figure 11:
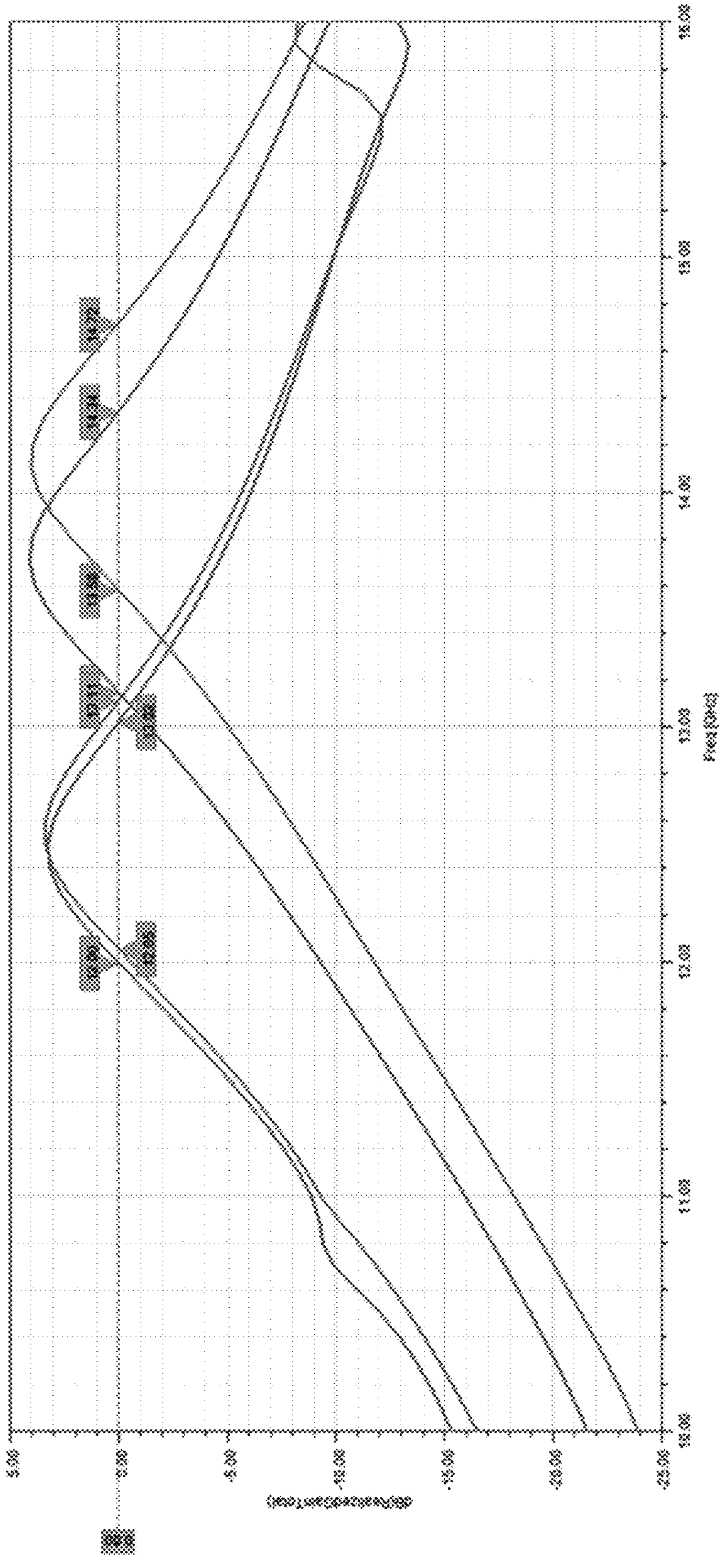
FIG. 11 is a gain simulation diagram of an antenna in a second example according to an embodiment of the present disclosure.

A second example: FIG. 9 is a top view of an antenna in the second example according to an embodiment of the present disclosure. As shown in FIG. 9, the antenna also includes, as in the first example, a first radiation patch 1 and a plurality of second radiation patches 2, each of which is connected to the first radiation patch 1 through a plurality of MEMS switches, except that both of the lengths and widths of the second radiation patches 2 in the antenna are different, and the numbers of the MEMS switches connected to the second radiation patches 2 are also different from each other. For example, the greater the width of the second radiation patch 2 is, the more MEMS switches are connected to the second radiation patch 2. For another example, the greater the area of the second radiation patch 2 is, the more MEMS switches are connected to the second radiation patch 2. In some examples, the width of the second radiation patch 2 is positively correlated to the number of MEMS switches connected to the second radiation patch 2. Referring to FIG. 9, the number of the second radiation patches 2 is two in FIG. 9, and the length and the width of one second radiation patch 2 are greater than those of the other second radiation patch 2, respectively. That is, the width of the second radiation patch 2 on the left side in FIG. 9 is greater than that of the second radiation patch 2 on the right side. Meanwhile, the second radiation patch 2 with a greater width is also longer. That is, the area of the second radiation patch on the left side is greater than that of the second radiation patch on the right side. Six MEMS switches are connected to the second radiation patch 2 with the greater width, and three MEMS switches are connected to the second radiation patch 2 with the less width. FIG. 10 is a frequency simulation diagram of the antenna in the second example according to an embodiment of the present disclosure, and FIG. 11 is a gain simulation diagram of the antenna in the second example according to an embodiment of the present disclosure. As shown in FIGS. 10 and 11, when the MEMS switches are both in the open state, the −10 dB impedance bandwidth is in a range of 14.00 GHz to 14.30 GHz, and the gain bandwidth is in a range of 13.58 GHz to 14.72 GHz. When the MEMS switches corresponding to the lower second radiation patch 2 are all in the closed state, the −10 dB impedance bandwidth is in a range of 13.55 GHz to 13.91 GHz, and the gain bandwidth is in a range of 13.15 GHz to 14.34 GHz. When the MEMS switches corresponding to the upper second radiation patch 2 are all in the closed state, the −10 dB impedance bandwidth is in a range of 12.38 GHz to 12.70 GHz, and the gain bandwidth: is in a range of 12.05 GHz to 13.5 GHz. When the MEMS switches are all in the closed state, the −10 dB impedance bandwidth is in a range of 12.30 GHz to 12.62 GHz, and the gain bandwidth is in a range of 12.00 GHz to 13.02 GHz. Therefore, as the number of the MEMS switches in the closed state is gradually increased, the area of the second radiation patches 2 participating in radiation also gradually increases, the impedance bandwidth/gain bandwidth gradually shifts left, and the antenna gain is approximately 4 dB. The simulation results show that the frequency reconfiguration may be realized by controlling the state of the MEMS switch, and the resonant frequency of the antenna may be adjusted in the Ku wave band.

Figure 12:
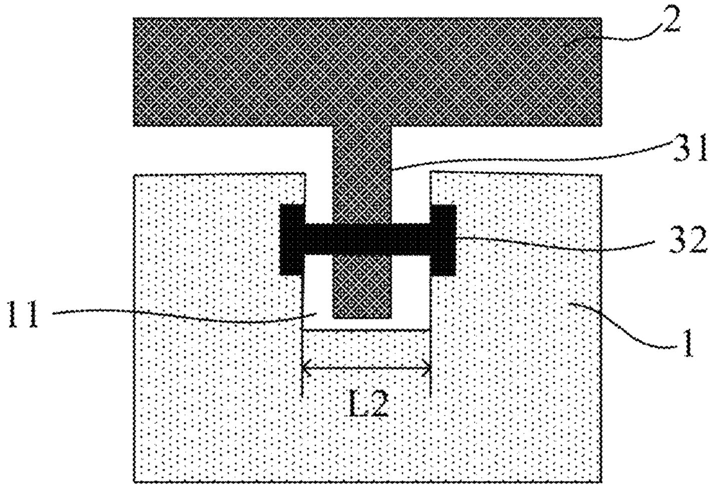
FIG. 12 is a top view of a part of an antenna in a third example at a position of an MEMS switch according to an embodiment of the present disclosure.
Figure 13:
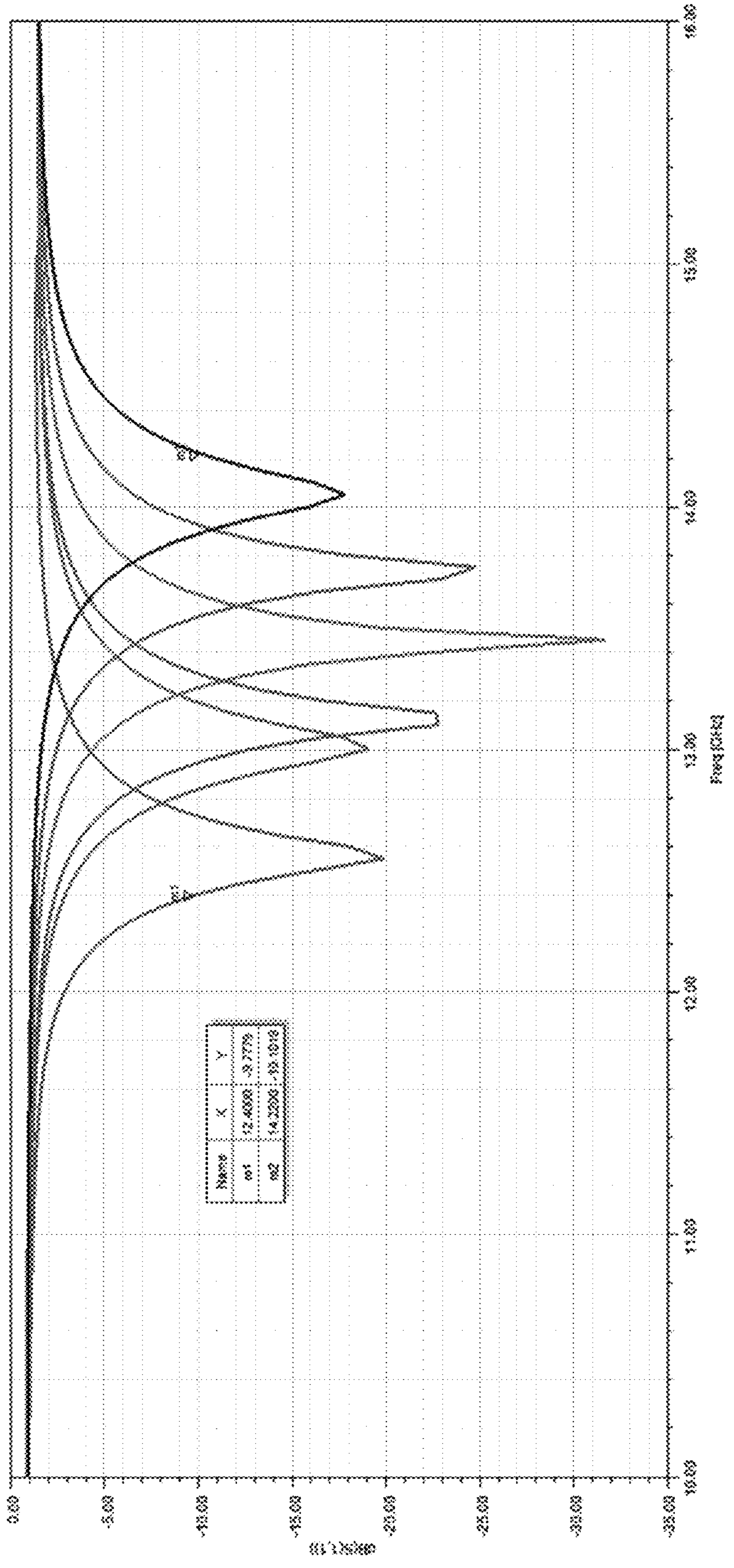
FIG. 13 is a frequency simulation diagram of an antenna in a third example according to an embodiment of the present disclosure.
Figure 14:
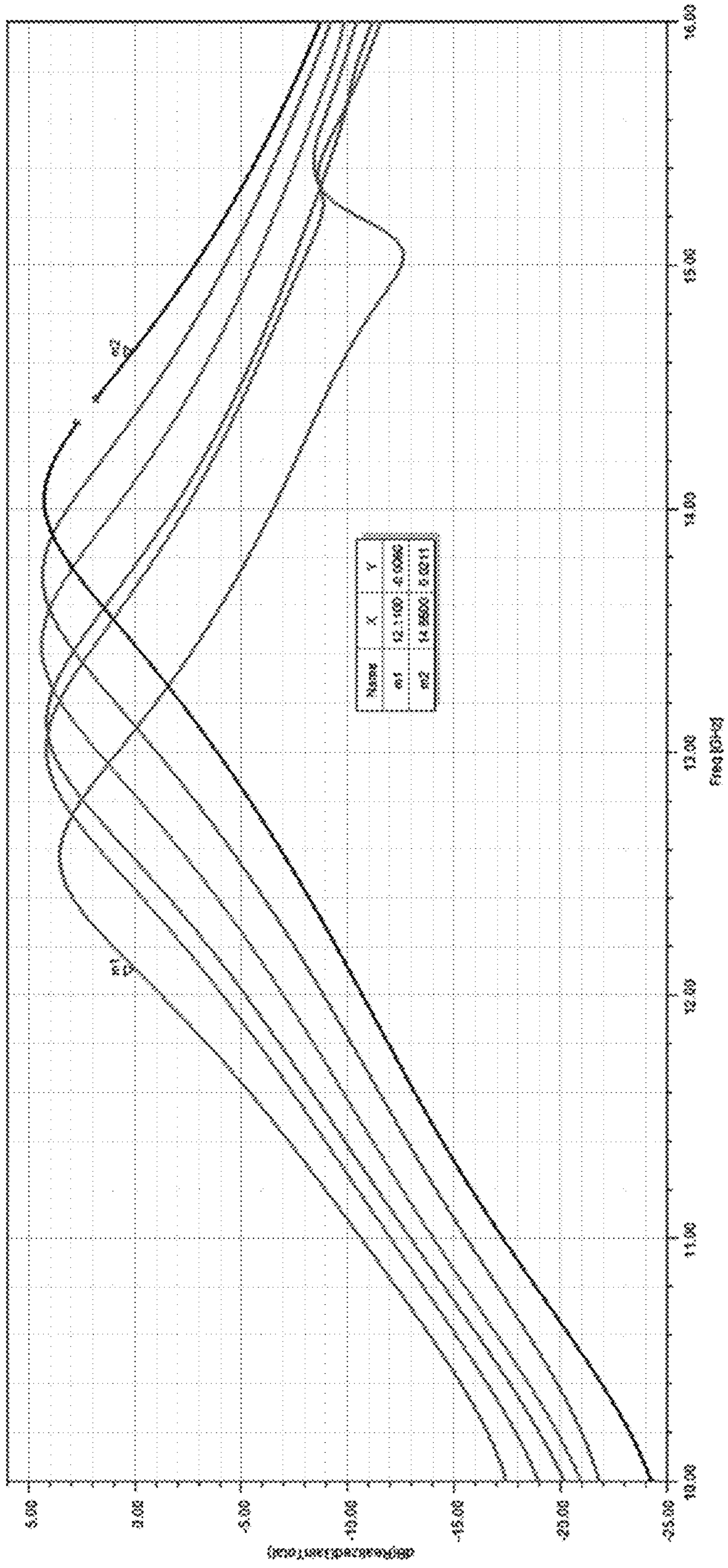
FIG. 14 is a gain simulation diagram of an antenna in a third example according to an embodiment of the present disclosure.

A third example: FIG. 12 is a top view of a part of an antenna in the third example at a position of an MEMS switch according to an embodiment of the present disclosure. Referring to FIG. 12, this example is substantially the same as the antenna in the first example, except that a width L2 of the membrane bridge 32 in the MEMS switch in this antenna is less than the width L1 of the membrane bridge 32 in the MEMS switch in the antenna in the first example. For example, L2=80 μm. The yield and stability of the MEMS switch may be improved by reducing the span of the membrane bridge 32 of the MEMS switch. FIG. 13 is a frequency simulation diagram of the antenna in the third example according to an embodiment of the present disclosure, and FIG. 14 is a gain simulation diagram of the antenna in the third example according to an embodiment of the present disclosure. As can be seen from FIGS. 13 and 14, as the number of the MEMS switches in the closed state gradually increases, the area of the second radiation patches 2 participating in radiation also gradually increases, the impedance bandwidth/gain bandwidth gradually shifts left, the −10 dB impedance bandwidth is in a range of 12.40 GHz to 14.22 GHz, the gain bandwidth is in a range of 12.11 GHz to 14.65 GHz, and the antenna gain is approximately 4.2 dB. The simulation results show that frequency reconfiguration may be realized by controlling the state of the MEMS switch, and the resonant frequency of the antenna is continuously adjustable in the Ku wave band.

Figure 15:
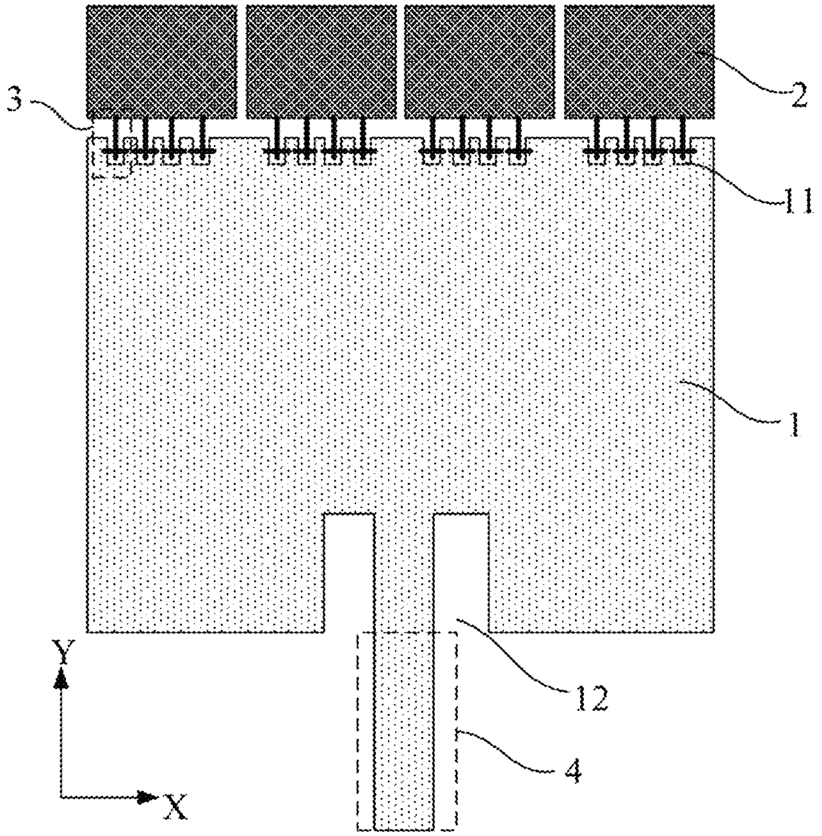
FIG. 15 is a top view of an antenna in a fourth example according to an embodiment of the present disclosure.
Figure 16:
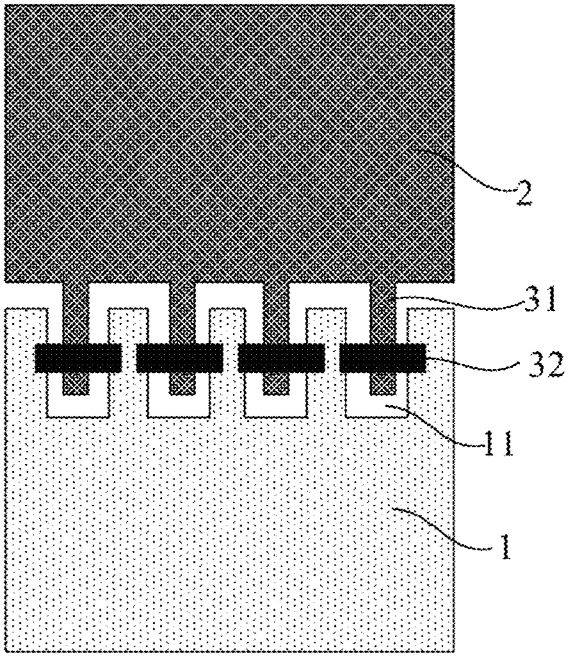
FIG. 16 is a top view of a part of an antenna in a fourth example at a position of an MEMS switch according to an embodiment of the present disclosure.
Figure 17:
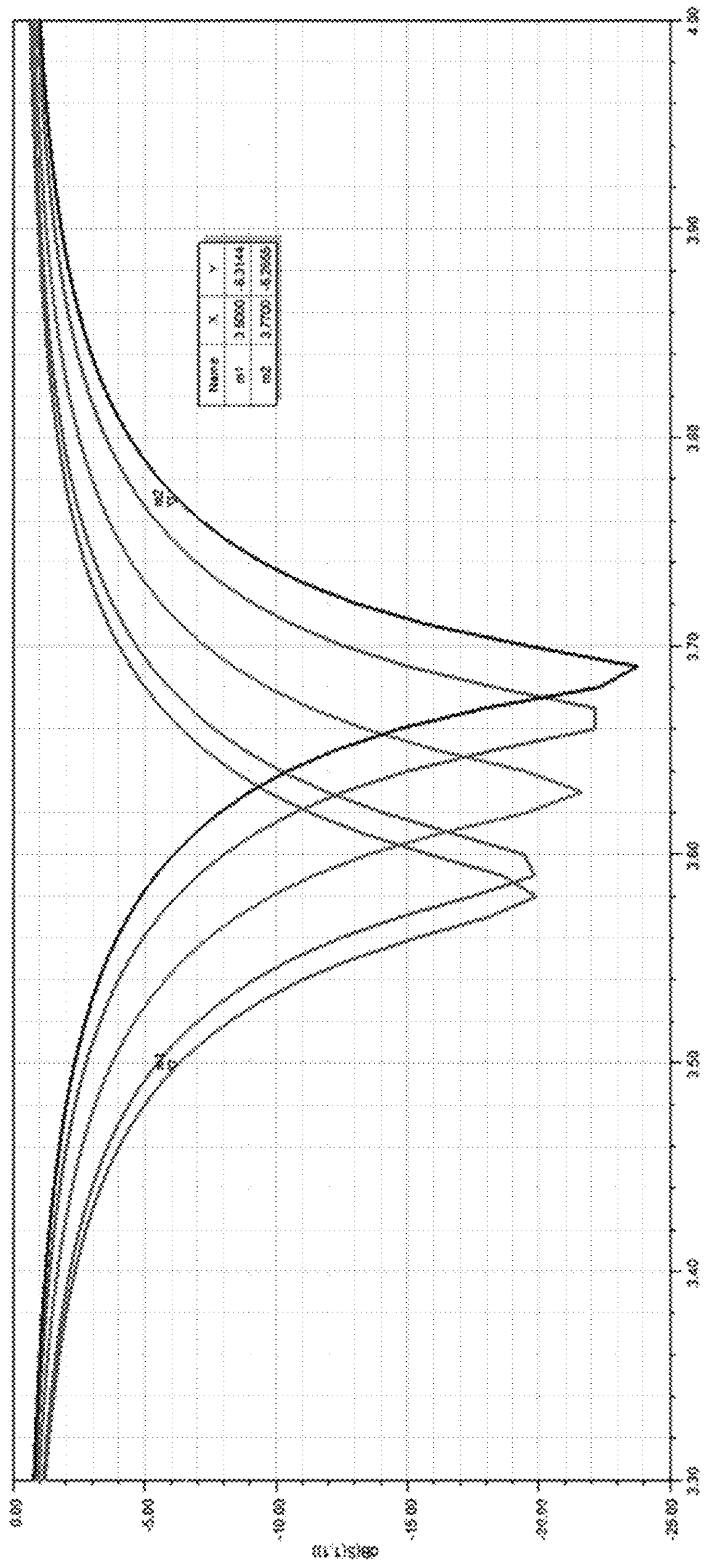
FIG. 17 is a frequency simulation diagram of an antenna in a fourth example according to an embodiment of the present disclosure.
Figure 18:
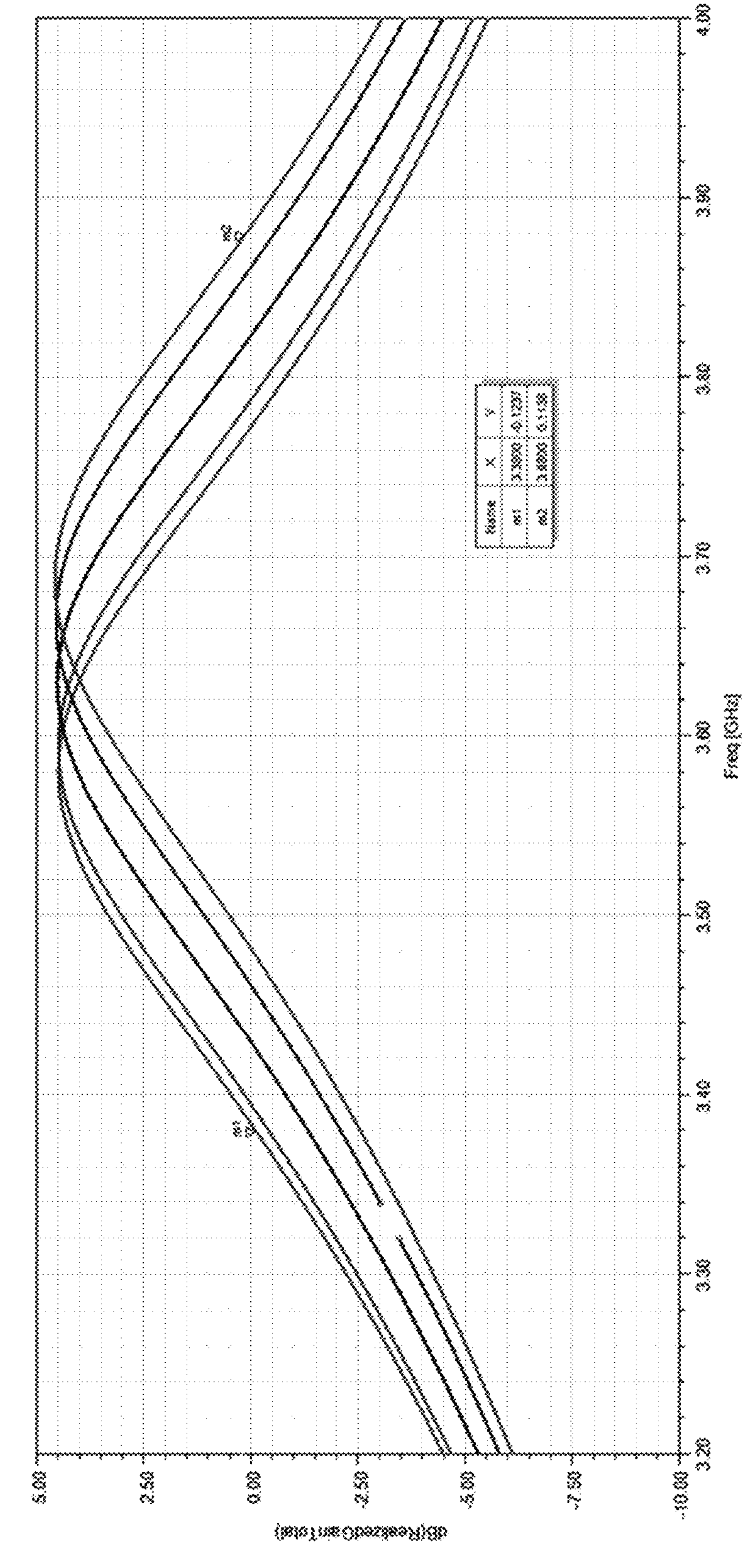
FIG. 18 is a gain simulation diagram of an antenna in a fourth example according to an embodiment of the present disclosure.

A fourth example: FIG. 15 is a top view of an antenna in the fourth example according to an embodiment of the present disclosure, and FIG. 16 is a top view of a part of an antenna in the fourth example at a position of an MEMS switch according to an embodiment of the present disclosure. Referring to FIGS. 15 and 16, the second radiation patches 2 in the antenna have the same width and length, that is, the areas of the second radiation patches are equal. In FIG. 16, each of the second radiation patches 2 is connected to the first radiation patch 1 through four MEMS switches, that is, 16 MEMS switches are included in the antenna. FIG. 17 is a frequency simulation diagram of the antenna in the fourth example according to an embodiment of the present disclosure, and FIG. 18 is a gain simulation diagram of the antenna in the fourth example according to an embodiment of the present disclosure. As can be seen from FIGS. 17 and 18, the area of the second radiation patches 2 is also gradually increased, the impedance bandwidth/gain bandwidth gradually shifts left, the −6 dB impedance bandwidth is in a range of 3.50 GHz to 3.77 GHz, the gain bandwidth is in a range of 3.38 GHz to 3.88 GHZ, and the antenna gain is approximately 4.5 dB. The simulation results show that the frequency reconfiguration may be realized by controlling the state of the MEMS switch, and the resonant frequency of the antenna is continuously adjustable in an n78 wave band.

Figure 19:
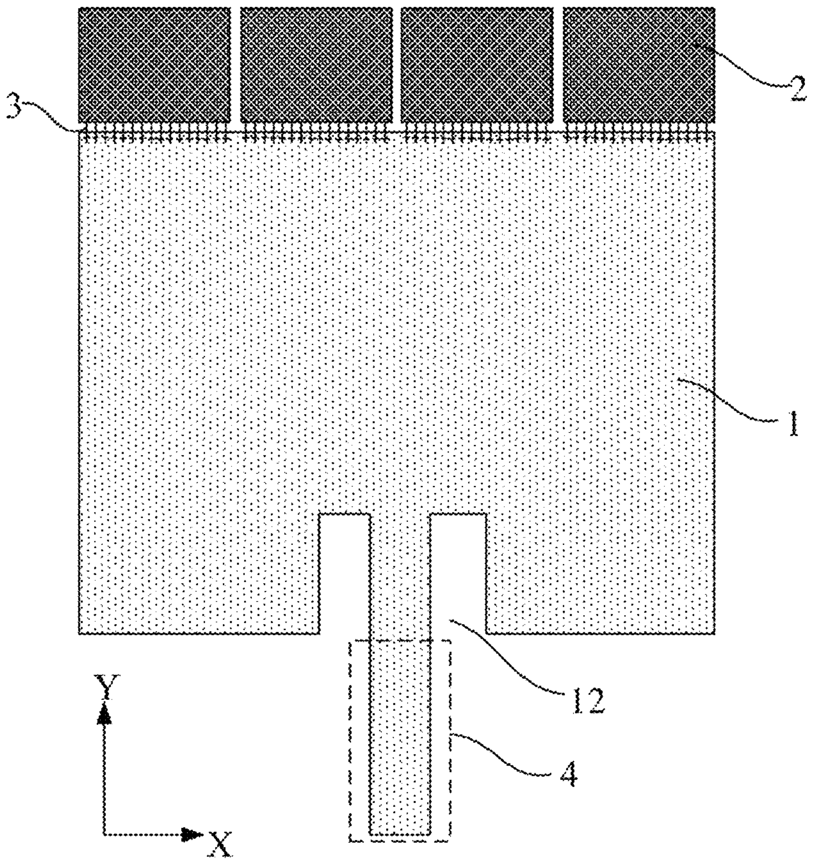
FIG. 19 is a top view of an antenna in a fifth example according to an embodiment of the present disclosure.
Figure 20:
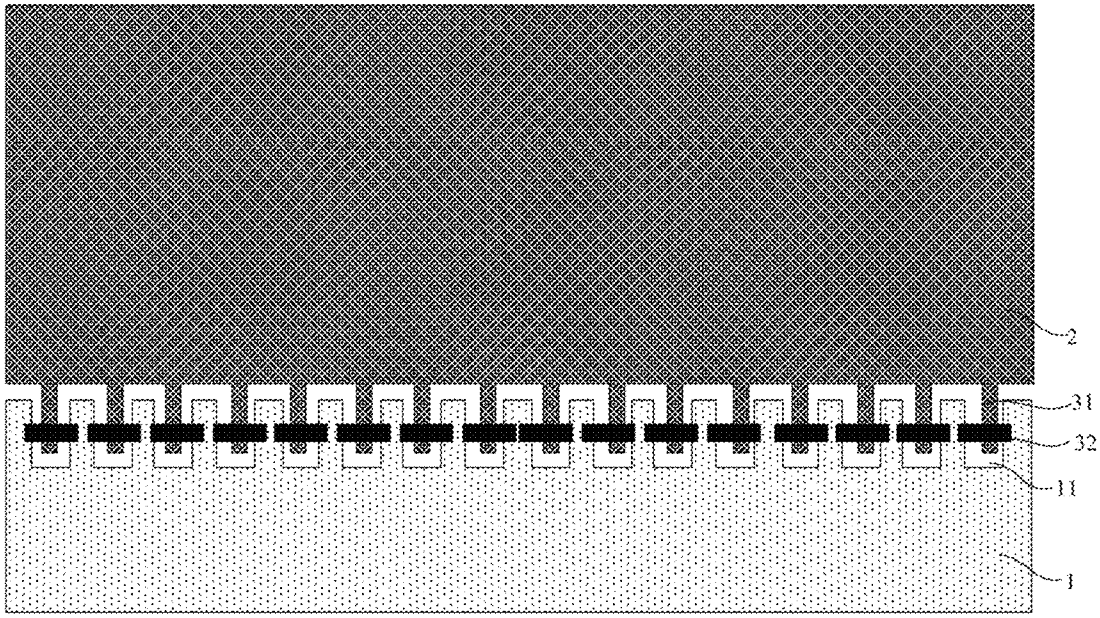
FIG. 20 is a top view of a part of an antenna in a fifth example at a position of an MEMS switch according to an embodiment of the present disclosure.
Figure 21:
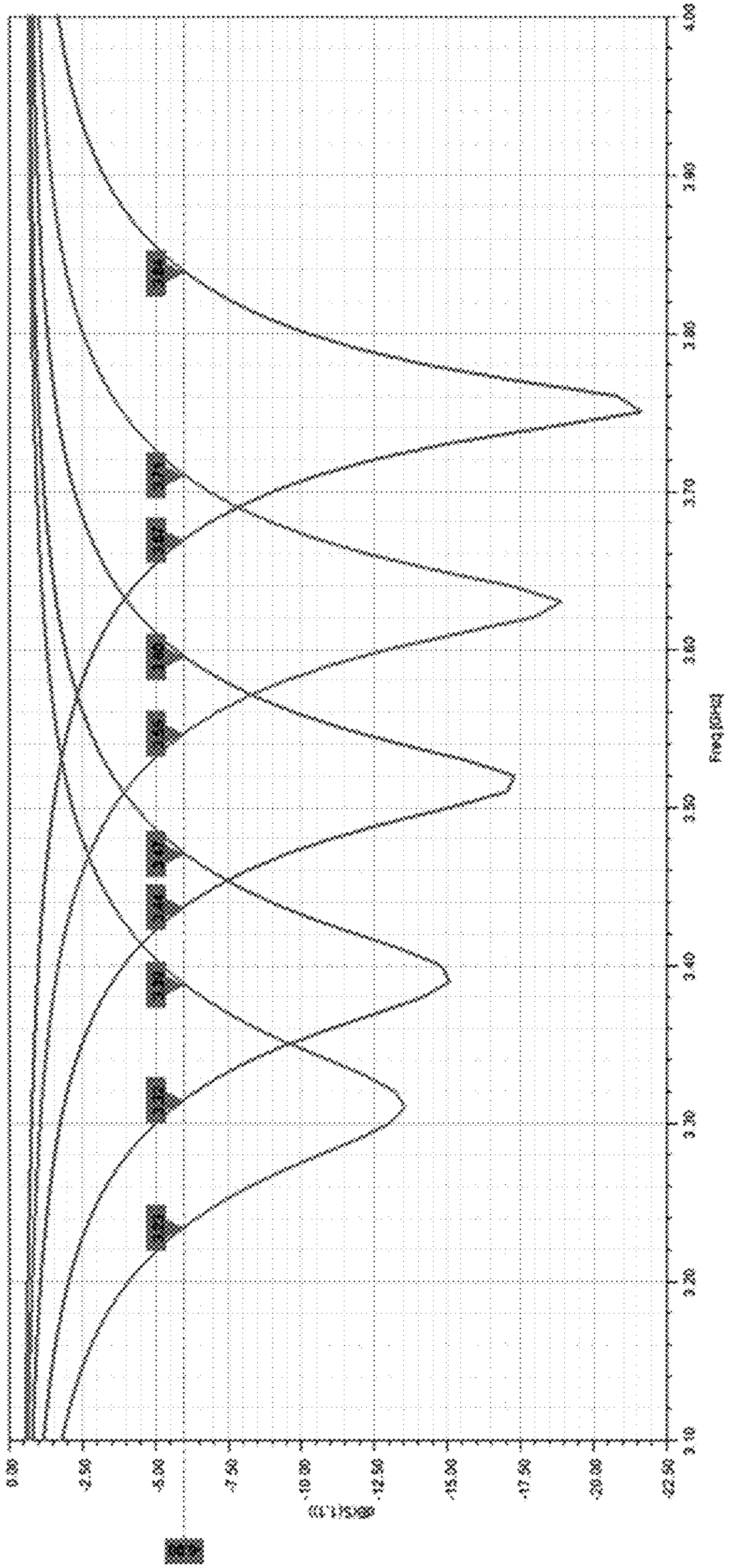
FIG. 21 is a frequency simulation diagram of an antenna in a fifth example according to an embodiment of the present disclosure.
Figure 22:
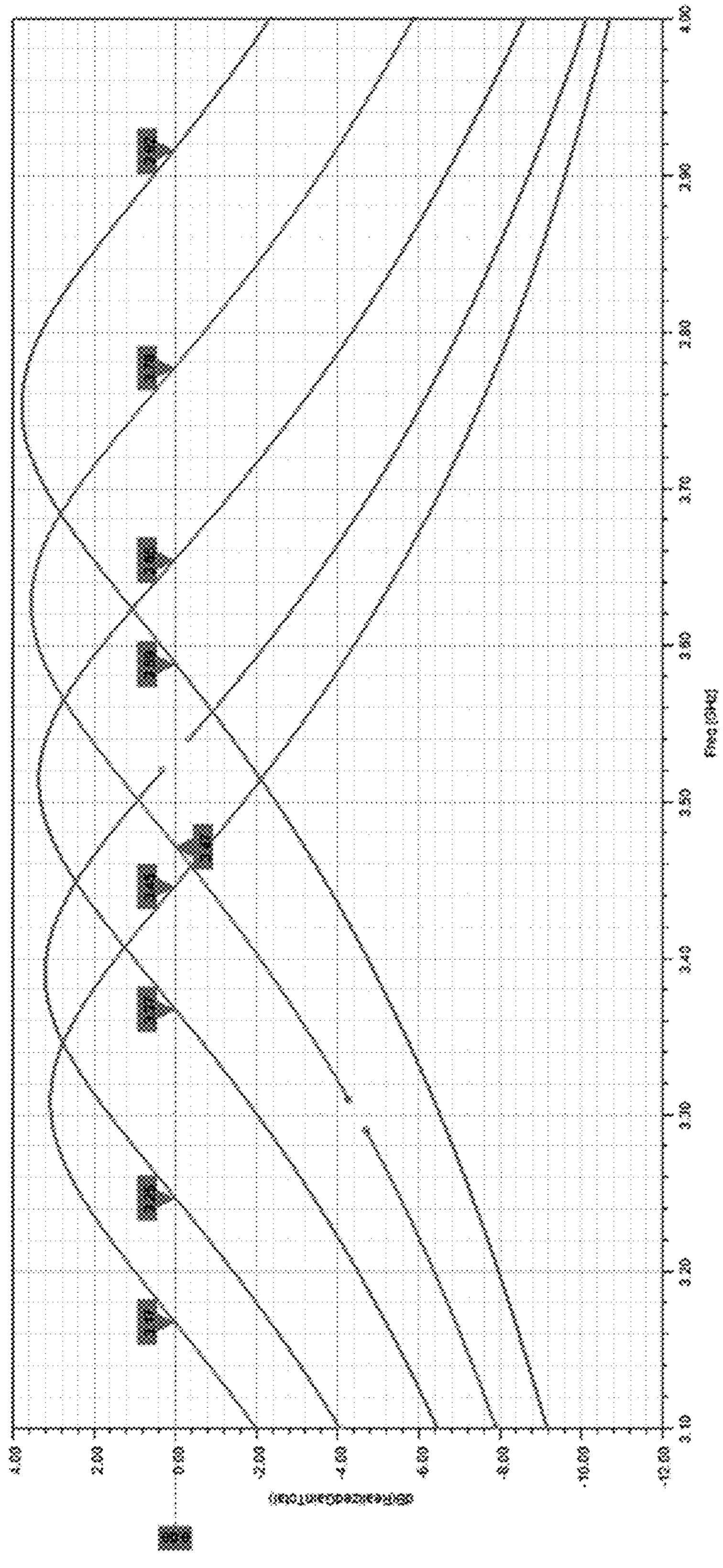
FIG. 22 is a gain simulation diagram of an antenna in a fifth example according to an embodiment of the present disclosure.

A fifth example: FIG. 19 is a top view of an antenna in the fifth example according to an embodiment of the present disclosure, and FIG. 20 is a top view of a part of an antenna at a position of an MEMS switch in the fifth example according to an embodiment of the present disclosure. As shown in FIGS. 19 and 20, the antenna in this example is substantially the same as the antenna in the fourth example, except that each second radiation patch 2 is connected to the first radiation patch 1 through more MEMS switches. For example, each second radiation patch 2 is connected to the first radiation patch 1 through sixteen MEMS switches, i.e. the antenna includes sixty four MEMS switches. FIG. 21 is a frequency simulation diagram of the antenna in the fifth example according to an embodiment of the present disclosure, and FIG. 22 is a gain simulation diagram of the antenna in the fifth example according to an embodiment of the present disclosure. As can be seen from FIGS. 21 and 22, as the number of the MEMS switches in the closed state gradually increases, the area of the second radiation patches 2 participating in radiation also gradually increases, the impedance bandwidth/gain bandwidth gradually shifts left. The increase of the number of the MEMS switches may improve the coupling efficiency between the first radiation patch 1 and the second radiation patch 2, so that compared with the fourth example, the impedance bandwidth and the gain bandwidth in this example are both significantly expanded. The −6 dB impedance bandwidth is in a range of 3.23 GHz to 3.84 GHz, the gain bandwidth is in a range of 3.17 GHz to 3.9 GHZ, and the antenna gain is approximately 3.9 dB. The simulation results show that the frequency reconfiguration may be realized by controlling the state of the MEMS switch, the n78 wave band may be covered, and the resonant frequency of the antenna is continuously adjustable in the n78 wave band.

A sixth example: This example is substantially the same as the antenna in the fourth example, except that: the bridge decks of the membrane bridges in the MEMS switches have the same width, and the first openings 11 have the same width; the thicknesses of the first insulating layers 5 covering the signal electrodes 31 of the MEMS switches connected to the same second radiation patch are equal to each other; the thicknesses of the first insulating layers 5 covering the signal electrodes 31 of the MEMS switches connected to different second radiation patches 2 are different, and the capacitance between the first radiation patch 1 and the second radiation patch 2 is changed by adjusting the thickness of the first insulating layer 5, so that the coupling efficiency between the first radiation patch 1 and the second radiation patch 2 is affected, and the resonant frequency of the antenna as a whole is adjusted. In some examples, the thickness of the first insulating layers 5 covering the signal electrodes 31 of the MEMS switches to different second radiation patches 2 monotonically increase or decrease along the first direction, thereby facilitating reconfiguration of the antenna with different frequencies.

Figure 23:
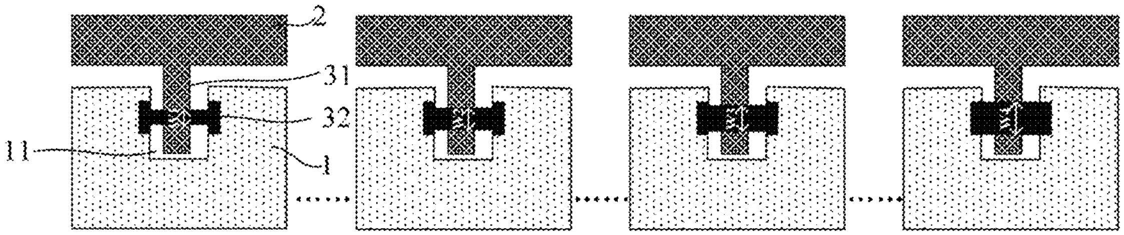
FIG. 23 is a schematic diagram of a part of an antenna in a fifth example according to an embodiment of the present disclosure.

A seventh example: FIG. 23 is a schematic view of a part of an antenna in the seventh example according to an embodiment of the present disclosure. As shown in FIG. 23, this example is substantially the same as the antenna in the sixth example except that the thicknesses of the first insulating layers 5 covering the signal electrodes 31 of the MEMS switches are equal to each other. The widths of the bridge decks of the membrane bridges in the MEMS switches connected to the same second radiation patch 2 are the same, and the widths of the bridge decks of the membrane bridges in the MEMS switches connected to different second radiation patches 2 are different. In FIG. 23, only a schematic diagram of each of the four second radiation patches 2 of the antenna being connected to only one MEMS switch is given. The capacitance between the first radiation patch 1 and the second radiation patch 2 may be changed by adjusting the width of the bridge deck of the membrane bridge, so that the coupling efficiency between the first radiation patch 1 and the second radiation patch 2 is affected, and the resonant frequency of the antenna as a whole is adjusted. In some examples, the widths of the bridge decks of the membrane bridges 32 of the MEMS switches connected to different second radiation patches 2 monotonically increase or decrease along the first direction, i.e., as shown in FIG. 23, $W1<W2<W3<W4$, to facilitate reconfiguration of the antenna with different frequencies. In a second aspect, an embodiment of the present disclosure provides a communication device, which may include the antenna described above.

In some examples, the communication device provided according to an embodiment of the present disclosure further includes a transceiving unit, a radio frequency transceiver, a signal amplifier, a power amplifier, and a filtering unit. The antenna in the communication device may be used as a transmitting antenna or as a receiving antenna. The transceiving unit may include a baseband and a receiving terminal, where the baseband provides a signal of at least one frequency band, for example, provides a 2G signal, a 3G signal, a 4G signal, a 5G signal, or the like, and transmits the signal of at least one frequency band to the radio frequency transceiver. After receiving a signal, the antenna in the communication system may transmit the signal to a receiving terminal in the transceiving unit after the signal is processed by the filtering unit, the power amplifier, the signal amplifier, and the radio frequency transceiver, where the receiving terminal may be, for example, an intelligent gateway.

Further, the radio frequency transceiver is connected to the transceiving unit and is used for modulating the signals transmitted by the transceiving unit or for demodulating the signals received by the antenna and then transmitting the signals to the transceiving unit. Specifically, the radio frequency transceiver may include a transmitting circuit, a receiving circuit, a modulating circuit, and a demodulating circuit. After the transmitting circuit receives various types of signals provided by the baseband, the modulating circuit may modulate the various types of signals provided by the baseband, and then transmit the modulated signals to the antenna. The antenna receives the signal and transmits the signal to the receiving circuit of the radio frequency transceiver, the receiving circuit transmits the signal to the demodulating circuit, and the demodulating circuit demodulates the signal and transmits the demodulated signal to the receiving terminal.

Further, the radio frequency transceiver is connected to the signal amplifier and the power amplifier, the signal amplifier and the power amplifier are further connected to the filtering unit, and the filtering unit is connected to at least one antenna. In the process of transmitting a signal by the communication system, the signal amplifier is used for improving a signal-to-noise ratio of the signal output by the radio frequency transceiver and then transmitting the signal to the filtering unit; the power amplifier is used for amplifying a power of the signal output by the radio frequency transceiver and then transmitting the signal to the filtering unit; the filtering unit specifically includes a duplexer and a filtering circuit, the filtering unit combines signals output by the signal amplifier and the power amplifier into a signal and filters out noise waves and then transmits the signal to the antenna, and the antenna radiates the signal. In the process of receiving a signal by the communication system, the antenna receives the signal and then transmits the signal to the filtering unit, the filtering unit filters out noise waves in the signal received by the antenna and then transmits the signal to the signal amplifier and the power amplifier, and the signal amplifier gains the signal received by the antenna and increases the signal-to-noise ratio of the signal; the power amplifier amplifies a power of the signal received by the antenna. The signal received by the antenna is processed by the power amplifier and the signal amplifier and then transmitted to the radio frequency transceiver, and the radio frequency transceiver transmits the signal to the transceiving unit.

In some examples, the signal amplifier may include various types of signal amplifiers, such as a low noise amplifier, which is not limited herein.

In some examples, the communication system provided according to an embodiment of the present disclosure further includes a power management unit, connected to the power amplifier, for providing the power amplifier with a voltage for amplifying the signal.

It will be understood that the above embodiments are merely exemplary embodiments adopted to illustrate the principles of the present disclosure, and the present disclosure is not limited thereto. It will be apparent to one of ordinary skill in the art that various modifications and improvements can be made without departing from the spirit and scope of the present disclosure, and such modifications and improvements are also considered to be within the scope of the present disclosure.

What is claimed is:

1. An antenna, comprising: a dielectric layer, and a first radiation patch, at least one second radiation patch and a feeding unit, which are on the dielectric layer, wherein the feeding unit is electrically connected to the first radiation patch, and each of the at least one second radiation patch is connected to the first radiation patch through at least one switch unit, wherein the first radiation patch comprises a first side edge and a second side edge extending in a first direction and opposite to each other in a second direction; the at least one second radiation patch is connected to the second side edge of the first radiation patch through the at least one switch unit; the at least one second radiation patch comprises a plurality of second radiation patches, which are arranged side by side along the first direction, wherein a side edge of the first radiation patch is provided with at least one first opening;

each of the at least one switch unit comprises a signal electrode and a membrane bridge; the signal electrode comprises a first end and a second end which are opposite to each other; the first end of the signal electrode is electrically connected to the second radiation patch, and an orthographic projection of the second end of the signal electrode on the dielectric layer is within an orthographic projection of one of the at least one first opening on the dielectric layer; the membrane bridge spans the one of the at least one first opening and is electrically connected to the first radiation patch; in the switch unit, an orthographic projection of the signal electrode on the dielectric layer overlaps an orthographic projection of the membrane bridge on the dielectric layer, and a first insulating layer is on a surface of the signal electrode facing the membrane bridge, wherein each membrane bridge comprises a bridge deck, and a first connecting arm connected at a first end of the bridge deck and a second connecting arm connected at a second end of the bridge deck; an orthographic projection of the bridge deck on the dielectric layer spans an orthographic projection of the one of the at least one first openings on the dielectric layer; and the first connecting arm and the second connecting arm are each directly connected to the first radiation patch, and widths of the bridge decks of the membrane bridges of the switch units connected to different second radiation patches monotonically increase or decrease along the first direction.

2. The antenna according to claim 1, wherein the at least one switch unit connected to each of the plurality of second radiation patches comprises a plurality of switch units.

3. The antenna according to claim 1, wherein lengths of the plurality of second radiation patches in the first direction are equal to each other, and each of the plurality of second radiation patches is connected to the first radiation patch through a same number of switch units.

4. The antenna according to claim 1, wherein lengths of the plurality of second radiation patches in the second direction increase as lengths of the plurality of second radiation patches in the first direction increase, or the lengths of the plurality of second radiation patches in the second direction decrease as the lengths of the plurality of second radiation patches in the first direction decrease.

5. The antenna according to claim 4, wherein a number of the at least one switch unit connected to the second radiation patch is positively correlated with a length of the second radiation patch in the first direction.

6. The antenna according to claim 1, wherein lengths of the plurality of second radiation patches in the first direction are equal to each other, and lengths of the plurality of second radiation patches in the second direction are equal to each other.

7. The antenna according to claim 6, wherein each of the plurality of second radiation patches is connected to the first radiation patch through a same number of switch units.

8. The antenna according to claim 6, wherein areas of orthographic projections of the signal electrodes in the switch units on the dielectric layer are equal to each other, and thicknesses of the first insulating layers in the switch units connecting to different second radiation patches are different from each other.

9. The antenna according to claim 6, wherein thicknesses of the first insulating layers in the switch units are equal to each other, areas of orthographic projections of the membrane bridges in the switch units connecting to different second radiation patches on the dielectric layer are different from each other, and areas of the signal electrodes in the switch units connecting to different second radiation patches are different from each other.

10. The antenna according to claim 1, wherein the feeding unit and the switch units are connected to different side edges of the first radiation patch.

11. The antenna according to claim 1, wherein the feeding unit is connected to the first side edge of the first radiation patch.

12. The antenna according to claim 1, wherein a connection line of orthographic projections of side edges of the plurality of second radiation patches on the dielectric layer forms a first line segment, wherein the side edges of the plurality of second radiation patches are connected to respective signal electrodes, a connection line of orthographic projections of two end points of the second side edge of the first radiation patch on the dielectric layer forms a second line segment, and the first line segment and the second line segment are aligned end to end.

13. The antenna according to claim 1, wherein the feeding unit comprises a microstrip line, and the microstrip line and the first radiation patch have a one-piece structure.

14. The antenna according to claim 13, wherein an extending direction of the microstrip line passes through a center of the first radiation patch.

15. The antenna according to claim 1, wherein the signal electrode and the second radiation patch connected to the signal electrode have a one-piece structure.

16. The antenna according to claim 1, wherein the first radiation patch is provided with a second opening, and an orthogonal projection of the feeding unit on the dielectric layer is within an orthogonal projection of the second opening on the dielectric layer.

17. An electronic device, comprising the antenna according to claim 1.

18. The antenna according to claim 1, wherein a length of at least one of the plurality of second radiation patches in the second direction is different from lengths of others of the plurality of second radiation patches in the second direction.

19. The antenna according to claim 18, wherein lengths of the plurality of second radiation patches in the second direction are different from each other, and monotonically increase or decrease along the first direction.

* * * * *